US011805502B2

(12) United States Patent
Abotabl et al.

(10) Patent No.: US 11,805,502 B2
(45) Date of Patent: Oct. 31, 2023

(54) DEMODULATION REFERENCE SIGNAL-ASSISTED LISTEN-BEFORE-TALK FOR FULL-DUPLEX WIRELESS COMMUNICATIONS IN UNLICENSED SPECTRUM

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Huilin Xu, Temecula, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 240 days.

(21) Appl. No.: 17/446,011

(22) Filed: Aug. 26, 2021

(65) Prior Publication Data

US 2022/0110122 A1 Apr. 7, 2022

Related U.S. Application Data

(60) Provisional application No. 63/088,379, filed on Oct. 6, 2020.

(51) Int. Cl.
*H04L 5/00* (2006.01)
*H04W 16/14* (2009.01)
(Continued)

(52) U.S. Cl.
CPC ....... *H04W 72/0453* (2013.01); *H04L 5/0048* (2013.01); *H04W 16/14* (2013.01);
(Continued)

(58) Field of Classification Search
CPC . H04W 72/0453; H04W 72/23; H04W 16/14; H04W 24/08; H04W 72/1268; H04W 74/0808; H04L 5/0048; H04L 5/14
(Continued)

(56) References Cited

U.S. PATENT DOCUMENTS

2018/0241499 A1* 8/2018 Einhaus ................ H04L 1/1671
2019/0090126 A1* 3/2019 Hayashi ................ H04W 74/02

* cited by examiner

*Primary Examiner* — Kwang B Yao
*Assistant Examiner* — Xuan Lu
(74) *Attorney, Agent, or Firm* — QUALCOMM Incorporated

(57) ABSTRACT

Aspects described herein relate to receiving, from a base station on a first subband of an unlicensed frequency band, control information that includes a resource allocation of an uplink transmission associated with the first UE and a demodulation reference signal (DMRS) configuration of a downlink transmission associated with a second UE. The apparatus also may obtain one or more measurements of a DMRS within channel activity on a second subband of the unlicensed frequency band using a listen-before-talk (LBT) operation based on the DMRS configuration. The apparatus also may determine whether the channel activity corresponds to the downlink transmission associated with the second UE based on the one or more measurements of the DMRS within the channel activity. The apparatus also may communicate, with the base station on the second subband, the uplink transmission when the channel activity corresponds to the downlink transmission associated with the second UE.

30 Claims, 14 Drawing Sheets

(51) Int. Cl.
*H04W 24/08* (2009.01)
*H04W 72/08* (2009.01)
*H04L 5/14* (2006.01)
*H04L 27/00* (2006.01)
*H04W 72/0453* (2023.01)
*H04W 74/08* (2009.01)
*H04W 72/1268* (2023.01)
*H04W 72/23* (2023.01)

(52) U.S. Cl.
CPC ....... *H04W 24/08* (2013.01); *H04W 72/1268* (2013.01); *H04W 72/23* (2023.01); *H04W 74/0808* (2013.01); *H04L 5/14* (2013.01)

(58) Field of Classification Search
USPC .......................................................... 370/277
See application file for complete search history.

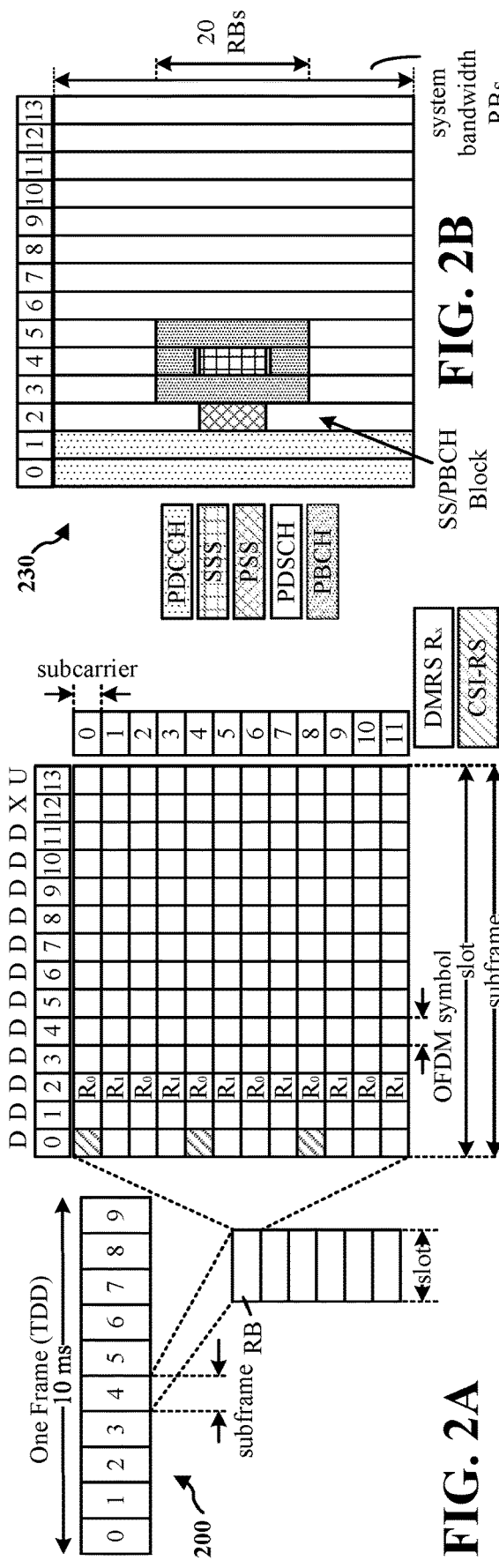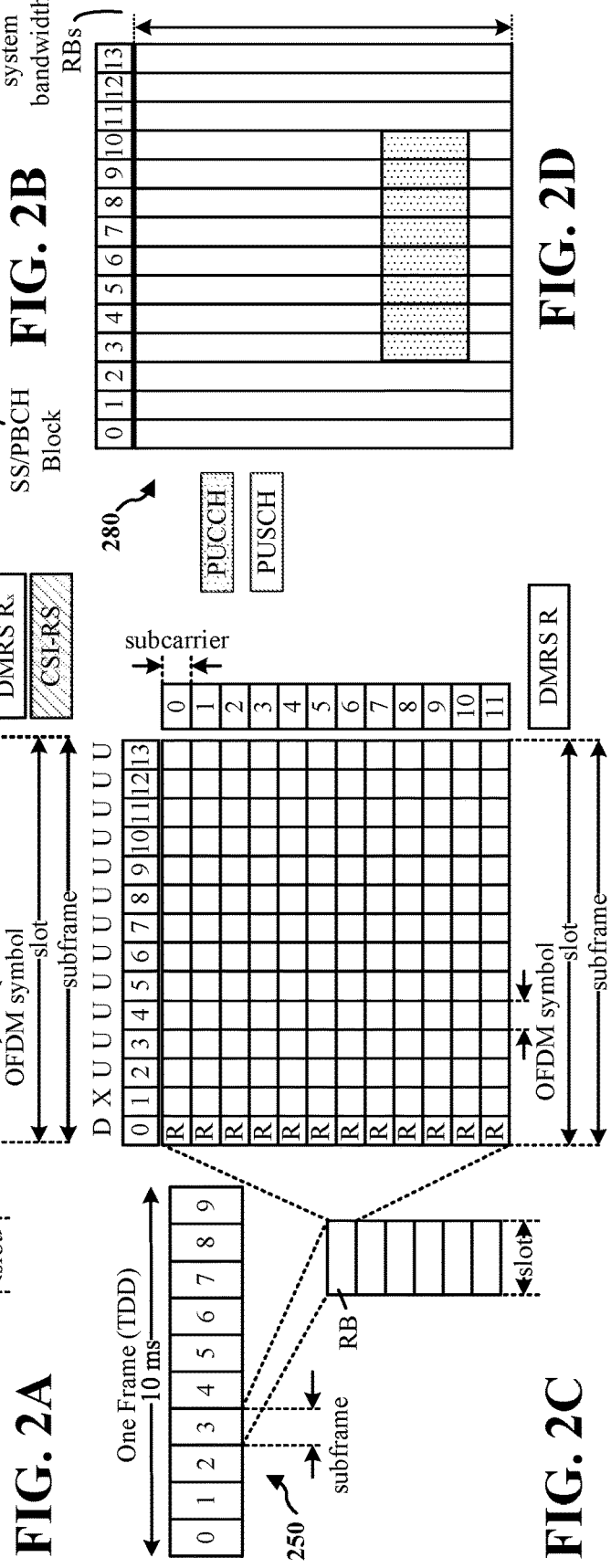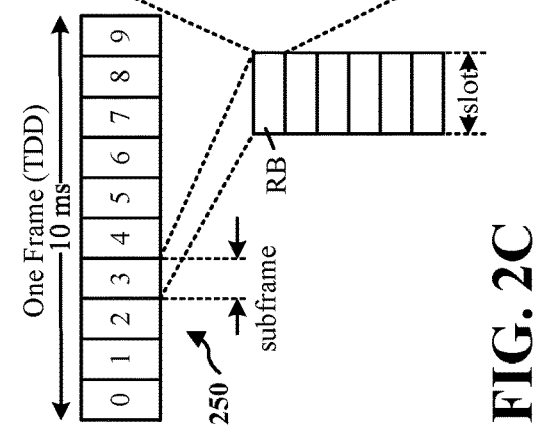

DEMODULATION REFERENCE SIGNAL-ASSISTED LISTEN-BEFORE-TALK FOR FULL-DUPLEX WIRELESS COMMUNICATIONS IN UNLICENSED SPECTRUM

CROSS REFERENCE TO RELATED APPLICATION(S)

This application claims the benefit of U.S. Provisional Patent Application Ser. No. 63/088,379, entitled "DEMODULATION REFERENCE SIGNAL-ASSISTED LISTEN-BEFORE-TALK FOR FULL-DUPLEX WIRELESS COMMUNICATIONS IN UNLICENSED SPECTRUM" and filed on Oct. 6, 2020, which is expressly incorporated by reference herein in its entirety.

BACKGROUND

Technical Field

The present disclosure relates generally to communication systems, and more particularly, to Demodulation Reference Signal (DMRS)-assisted Listen-Before-Talk (LBT) for full-duplex wireless communications in unlicensed spectrum.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Aspects of wireless communication may comprise direct communication between devices, such as based on sidelink. There exists a need for further improvements in sidelink communication technology. These improvements may also be applicable to other multi-access technologies and the telecommunication standards that employ these technologies.

In some wireless communication technologies, a user equipment (UE) and/or an base station can be configured for full duplex (FD) communications where the UE and/or base station can concurrently transmit and receive over wireless communication resources within the same frequency band or the same component carrier.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A base station can be capable of full-duplex communications in transmitting downlink signaling to a first UE while concurrently receiving uplink transmission from a second UE. The base station may operate in a full-duplex mode, where the base station may transmit downlink signaling to the first UE and at the same time wants to serve the second UE with an uplink transmission. The second UE may receive downlink control information that schedules the uplink transmission. The second UE may perform a listen-before-talk (LBT) operation, or other channel assessment procedure for acquiring a channel, prior to the uplink scheduling grant and detect any channel activity that may cause the second UE to drop or delay the uplink transmission. However, the channel activity may include other inter-cell downlink transmissions occupying the same band that can cause the second UE to drop or delay the uplink transmission.

The present disclosure provides for a DMRS-assisted LBT operation that uses a DMRS of the downlink signaling by an uplink scheduled UE to determine channel availability during a downlink transmission to another UE. If the uplink scheduled UE can distinguish between the base station downlink signaling and the inter-cell downlink transmissions or other technologies occupying the same band, then the uplink scheduled UE can transmit the uplink signal without wasting resources. The subject technology can help improve the performance of uplink communications and increase the utilization of resources in an efficient manner.

In an aspect of the disclosure, a method, a computer-readable medium, and an apparatus are provided. The apparatus is configured to receiving, from a base station on a first subband of an unlicensed frequency band, control information comprising a resource allocation of an uplink transmission associated with the first UE and a demodulation reference signal (DMRS) configuration of a downlink transmission associated with a second UE. The apparatus is also configured to obtain one or more measurements of a DMRS within channel activity on a second subband of the unlicensed frequency band using a listen-before-talk (LBT) operation based on the DMRS configuration. The apparatus is also configured to communicate, with the base station on the second subband, the uplink transmission when the channel activity corresponds to the downlink transmission associated with the second UE based on the one or more measurements of the DMRS within the channel activity.

In another aspect of the disclosure, a method, a computer-readable medium, and an apparatus are provided. The apparatus is configured to generate control information comprising a resource allocation of an uplink transmission associated with a first user equipment (UE) and a demodulation reference signal (DMRS) configuration of a downlink transmission associated with a second UE. The apparatus is also configured to transmit, to the first UE on a first subband of an unlicensed frequency band, the control information. The apparatus is also configured to receive, from the first UE on the second subband, the uplink transmission based on the DMRS configuration and a correspondence between channel activity on the second subband and the downlink transmission associated with the second UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
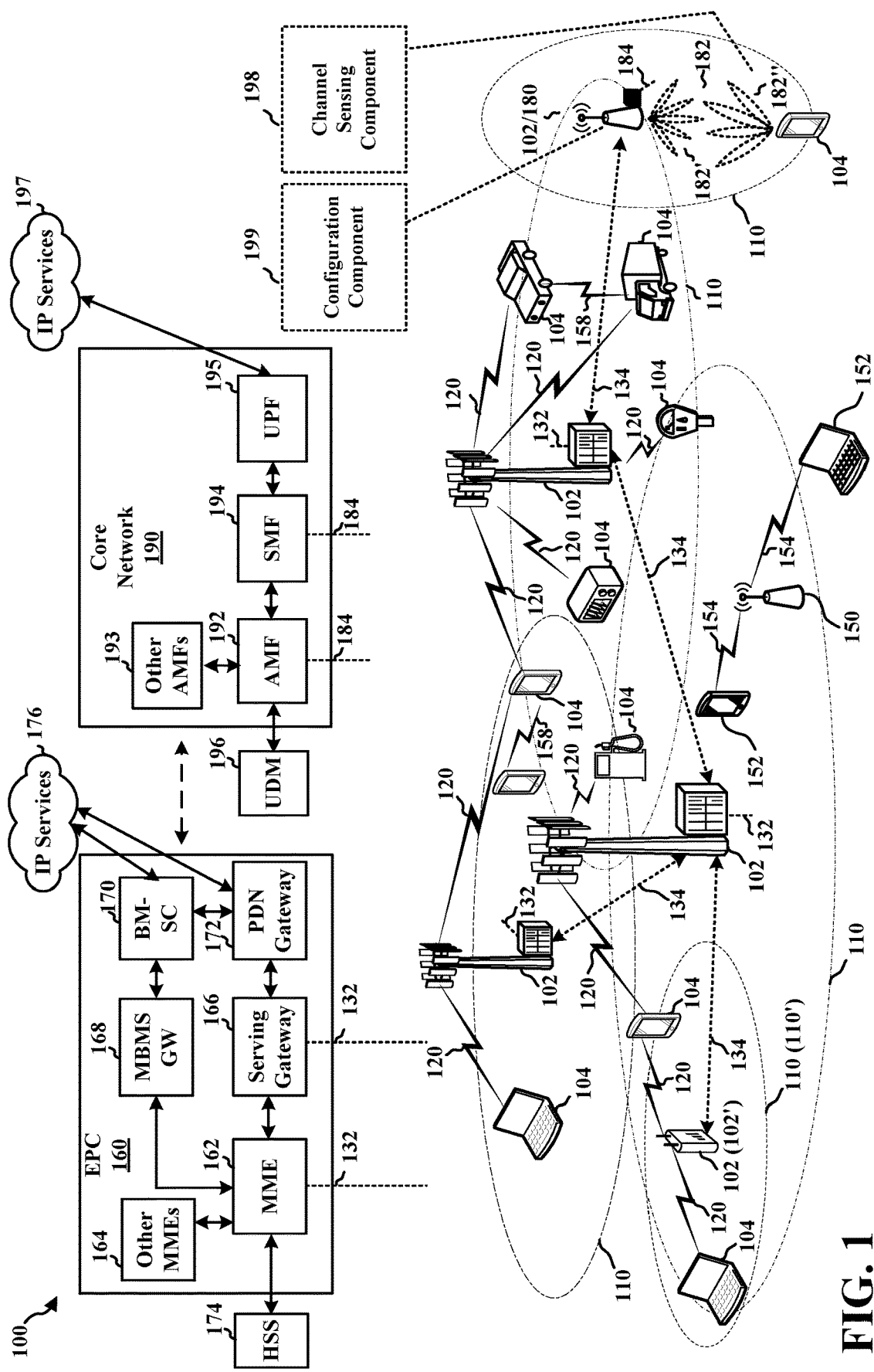
FIG. 1 is a diagram illustrating an example of a wireless communications system and an access network.

The described features generally relate to scheduling devices to communicate with a base station capable of full duplex (FD) communications. FD communications, as referred to herein, can include a single node (e.g., a user equipment (UE) or access point) transmitting and receiving (e.g., concurrently) over communication resources in the same frequency band and/or over communication resources in the same component carrier (CC). In one aspect, FD communications can include in-band full duplex (IBFD) where the single node can transmit and receive on the same time and frequency resource, and the downlink and uplink can share the same IBFD time/frequency resources (e.g., full and/or partial overlap). In another aspect, FD communications can include sub-band FD (also referred to as "flexible duplex") where the single node can transmit and receive at the same time but on different frequency resources within the same frequency band (or over communication resources in the same CC), where the downlink resource and the uplink resources can be separated in the frequency domain (e.g., by a guard band). In an aspect, the guard band in sub-band FD can be on the order of resource block (RB) widths (e.g., 180 kilohertz (KHz) for third generation partnership project (3GPP) long term evolution (LTE) and fifth generation (5G) new radio (NR), 360 and 720 KHz for NR, etc.). This can be distinguished from a guard band in frequency division duplexing (FDD) communications defined in LTE and NR, which can be 5 megahertz (MHz) or more, and the associated resources in FDD are defined between frequency bands, but not within the same frequency band (or resources in the same CC) as is the case in sub-band FD communications.

In addition, for example, the UE and base station can communicate in an unlicensed frequency spectrum, such that the UE and base station can acquire a communication medium before transmitting uplink communications. For example, acquiring the communication medium can include acquiring a channel (e.g., a frequency range corresponding to a E-UTRA Absolute Radio Frequency Channel Number (EARFCN)) by performing a listen-before-talk (LBT) operation or other clear channel assessment (CCA) operation to ensure the channel is free for transmission before communicating over the channel. In some aspects, the LBT operation is used for competitive resolution of access to shared frequency resources in a licensed or unlicensed frequency spectrum. The LBT operation may include performing a CCA procedure to determine whether a shared channel is available. The UE may monitor a frequency and determine whether other transmissions are occurring on that frequency. When it is determined that a shared channel is available, the device may send a signal to reserve the channel prior to data transmission. Other devices may monitor the reservation signal to detect transmissions and may use energy detection to monitor the shared channel to determine whether the shared channel is busy or free.

Where a base station is operating in a full-duplex mode, the base station can transmit a downlink (DL) signal to a first user equipment (UE) and at the same time can serve a second UE allowing the second UE to transmit a physical uplink shared channel (PUSCH) transmission. In this regard, for example, the second UE can receive downlink control information (DCI) in a downlink control channel (e.g., physical downlink control channel (PDCCH)) scheduling the PUSCH transmission. The second UE can then perform LBT before the PUSCH grant to determine if the communication medium is free before transmitting over the resources of the PUSCH grant. In this example, however, as the base station is transmitting to the first UE, the second UE may find activity on the communication medium (e.g., channel) which may lead failure of the LBT before the PUSCH resources and thus the second UE may drop or delay the PUSCH transmission. As the base station is capable of full-duplex, however, the base station can receive the PUSCH transmission from the second UE while transmitting the DL signal to the first UE.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MIME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to perform DMRS-assisted LBT operations for full-duplex wireless communications in an unlicensed spectrum. For example, the UE 104 of FIG. 1 may include a channel sensing component 198 configured to receive, from a base station on a first subband of an unlicensed frequency band, in which the control information includes a resource allocation of an uplink transmission associated with the first UE and a DMRS configuration of a downlink transmission associated with a second UE. The UE 104 may obtain one or more measurements of a DMRS within channel activity on a second subband of the unlicensed frequency band using an LBT operation based on the DMRS configuration. The UE 104 may determine whether the channel activity corresponds to the downlink transmission associated with the second UE based on the one or more measurements of the DMRS within the channel activity. The UE 104 may communicate, with the base station on the second subband, the uplink transmission when the channel activity corresponds to the downlink transmission associated with the second UE.

Referring again to FIG. 1, in certain aspects, the base station 102/180 may be configured to provide a DMRS configuration to facilitate the DMRS-assisted LBT operations in full-duplex wireless communications over an unlicensed spectrum. For example, the base station 102/180 of FIG. 1 may include a configuration component 199 configured to generate control information comprising a resource allocation of an uplink transmission associated with a first UE and a DMRS configuration of a downlink transmission associated with a second UE. The base station 102/180 may transmit, to the first UE on a first subband of an unlicensed frequency band, the control information. The base station 102/180 also may receive, from the first UE on the second subband, the uplink transmission based on the DMRS configuration and a correspondence between channel activity on the second subband and the downlink transmission associated with the second UE.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The sub-carrier spacing and symbol length/duration are a function of the numerology. The subcarrier spacing may be equal to $2^\mu * 15$ kKz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=0 with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
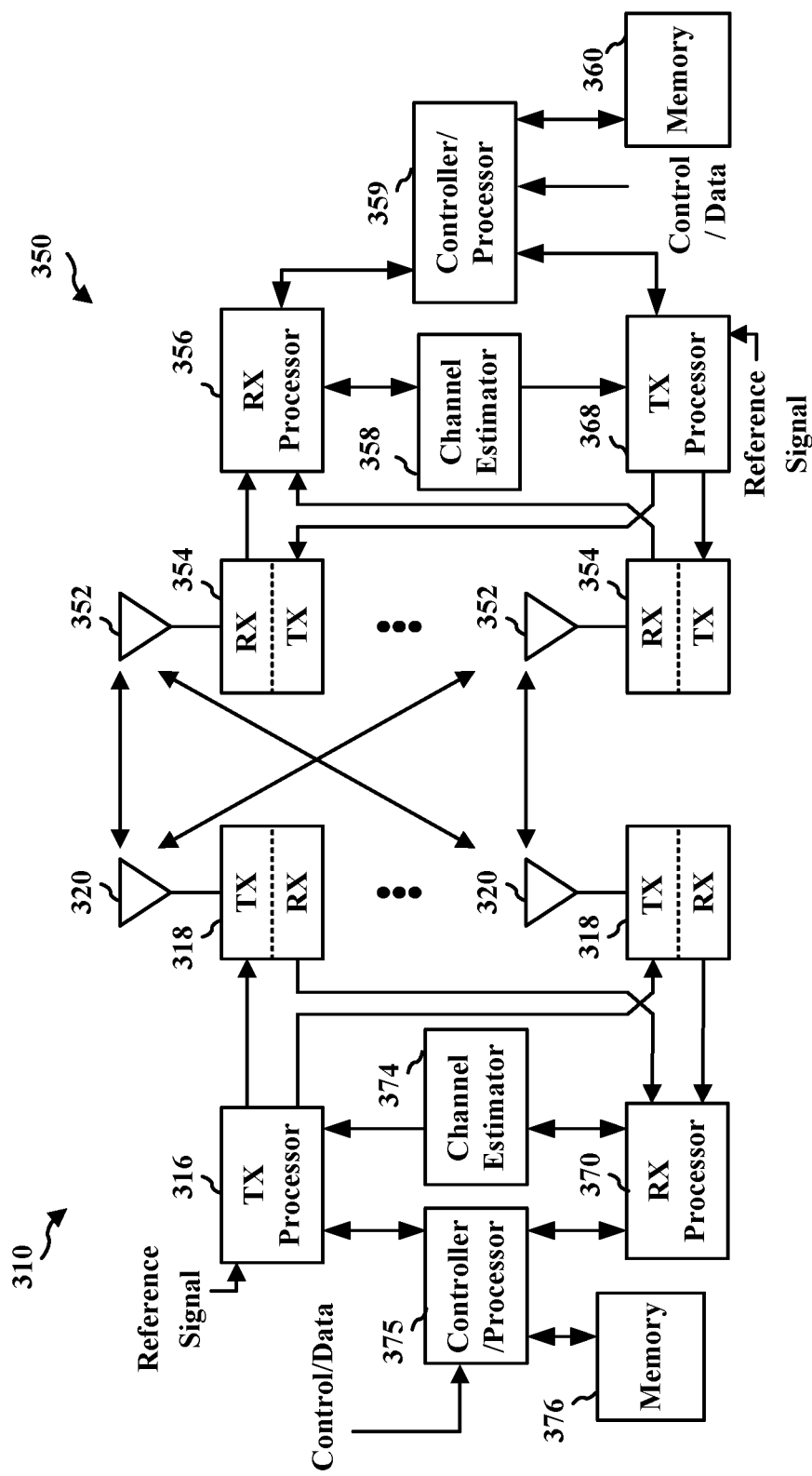
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/ processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the channel sensing component 198 of FIG. 1.

At least one of the TX processor 316, the RX processor 370, and the controller/processor 375 may be configured to perform aspects in connection with the configuration component 199 of FIG. 1.

Figure 4A:
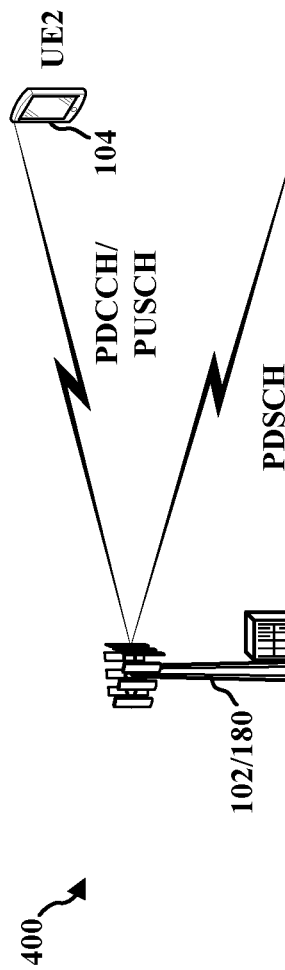
FIGS. 4A and 4B are diagrams illustrating a full-duplex wireless communication environment and communication flow timeline, in accordance with various aspects of the present disclosure.

FIG. 4A illustrates an example of a wireless communication environment 400, where a base station 102/180 can be capable of full-duplex communications in transmitting downlink signaling to a first UE 104 (e.g., UE1) while concurrently receiving uplink transmission from a second UE 106 (e.g., UE2). As illustrated in FIG. 4A, the base station may operate in a full-duplex mode. The base station 102/180 may transmit the downlink signaling to UE1 and at the same time wants to serve UE2 with a PUSCH transmission. The UE2 may receive the PDCCH scheduling PUSCH. The UE2 may perform an LBT operation prior to the PUSCH grant and detect any channel activity that may cause UE2 to drop or delay the PUSCH transmission.

Figure 4B:
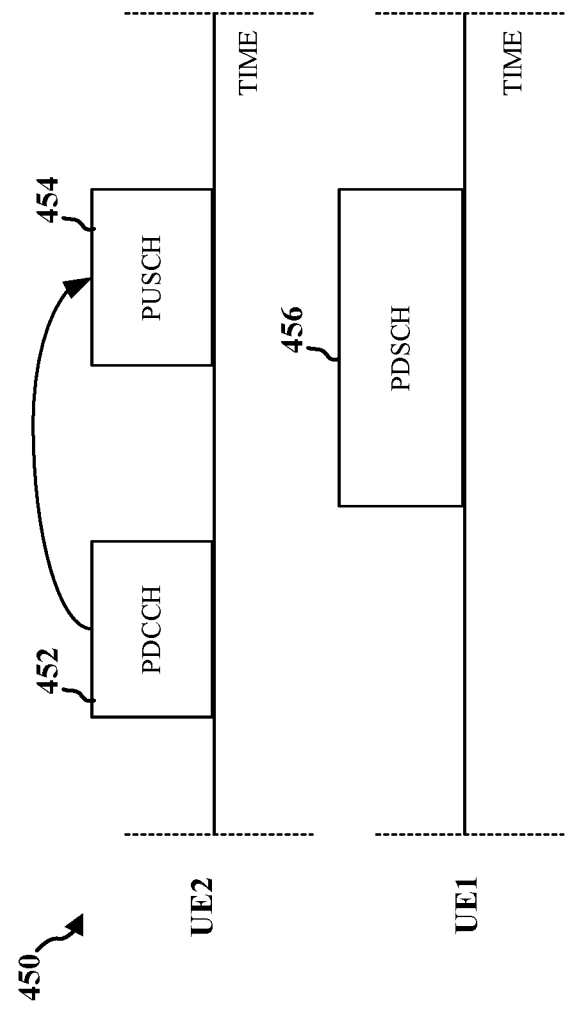

FIG. 4B illustrates an example of a timeline 450 for communications between a base station (e.g., BS 102/180) and a first UE (UE1) and between the base station and a second UE (UE2). In timeline 450, the base station can transmit a PDCCH 452 to UE2 indicating resources for UE2 to transmit PUSCH 454. The base station also can transmit a PDSCH 406 to UE1 that at least partially overlaps PUSCH 454 in time and/or frequency, such that when UE2 performs an LBT operation for transmitting PUSCH 454, UE2 may sense signal energy from the base station transmitting PDSCH 456. Because the base station is full-duplex capable, the base station may be able to receive PUSCH 454 while transmitting PDSCH 456, and thus the signal energy from PDSCH 456 detected during the LBT operation for PUSCH 454 may not prohibit the PUSCH 454 transmission. However, the channel activity may include other inter-cell downlink transmissions occupying the same band that may cause UE2 to drop or delay the PUSCH transmission. Some examples of other inter-cell downlink transmissions may include downlink transmissions associated with other radio access technologies (e.g., WiFi, Bluetooth) or downlink transmissions associated with other base stations that co-exist within the cell coverage. The present disclosure provides for a DMRS-assisted LBT operation that includes utilization of a DMRS of the downlink signaling by the uplink scheduled UE (e.g., UE2) to determine channel availability during a downlink transmission. If the uplink scheduled UE can distinguish between the base station downlink signaling and the inter-cell downlink transmissions or other technologies occupying the same band, then the uplink scheduled UE can transmit the uplink signal without wasting resources.

Figure 5:
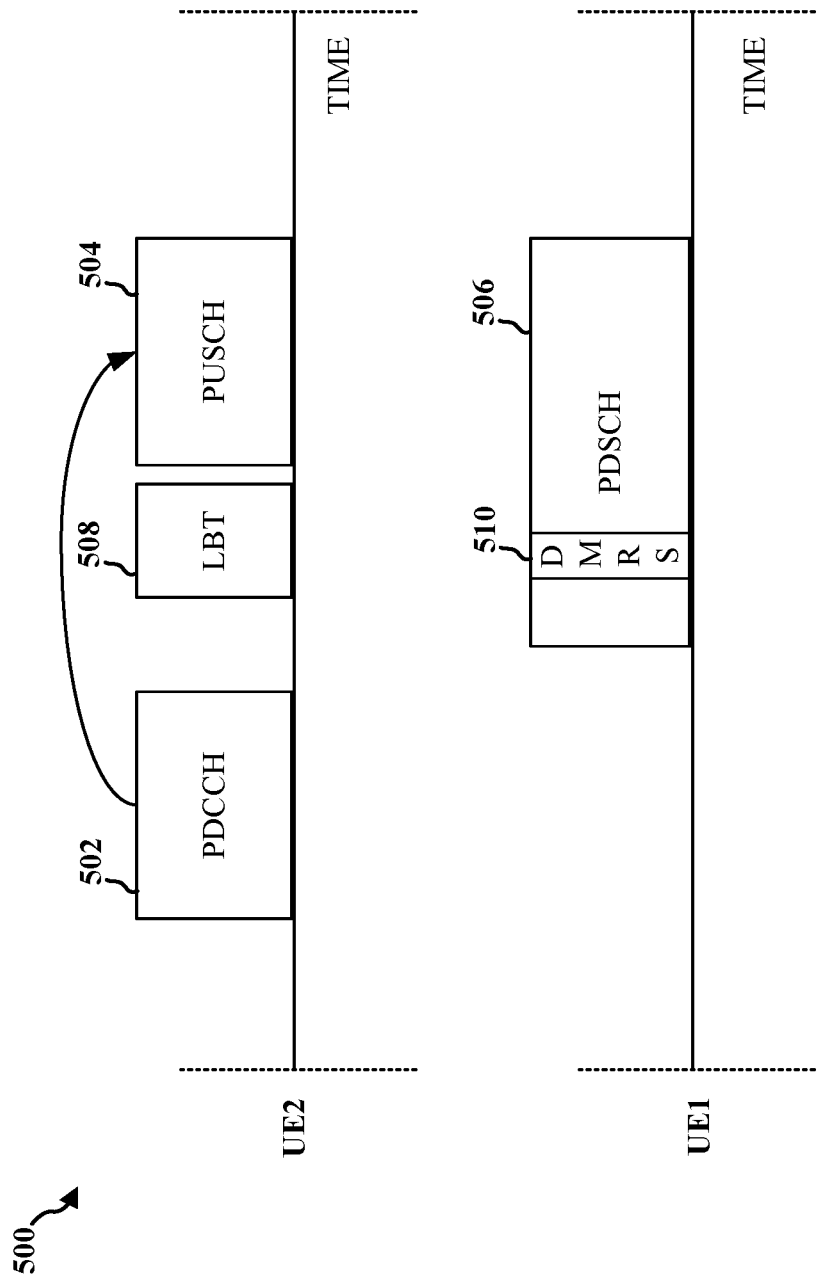
FIG. 5 is a diagram illustrating an example of a timeline in a communication flow with DMRS-assisted LBT for full-duplex wireless communications, in accordance with various aspects of the present disclosure.

FIG. 5 is a diagram illustrating an example of a timeline 500 in a communication flow with DMRS-assisted LBT for full-duplex wireless communications, in accordance with various aspects of the present disclosure. As depicted in FIG. 5, the timeline 500 illustrates communications between a base station (e.g., BS 102/180) and a first UE (UE1) and between the base station and a second UE (UE2). In timeline 500, the base station can transmit a PDCCH 502 to UE2 indicating resources for UE2 to transmit PUSCH 504. For example, the PDCCH 502 may include control information that includes a resource allocation of the PUSCH 504. The base station also can transmit a PDSCH 506 to UE1 that at least partially overlaps PUSCH 504 in time and/or frequency.

In some aspects, the control information includes an indication of existence or non-existence of the downlink transmission associated with the second UE at least partially overlapping resources of the uplink transmission associated with the first UE in one or more of time or frequency. In various aspects, the control information includes a DMRS configuration of the PDSCH 506. The DMRS configuration may include one or more of a location of a DMRS 510 in time and frequency, a precoder associated with the DMRS 510, and/or a transmission power of the DMRS 510 in the PDSCH 506. In some aspects, the BS 102/180 may determine whether the PDSCH 506 overlaps the PUSCH 504. The BS may select a first PDCCH of a plurality of PDCCHs, multiplexed in time or frequency of a subband in the unlicensed spectrum, for transmission of the control information when the PDSCH 506 overlaps the PUSCH 504.

In some implementations, the UE2 performs an LBT operation 508 for transmitting PUSCH 504. The UE2 may sense signal energy from the base station transmitting PDSCH 506. For example, the UE2 may obtain one or more measurements of the DMRS 510 within the sensed channel activity occupying the same band as the PUSCH 504 based on the DMRS configuration. In some aspects, the LBT operation 508 may be performed immediately prior to the transmission of the PUSCH 504. In other aspects, the LBT operation 508 may be performed at a predetermined time prior to the transmission of the PUSCH 504. Although FIG. 5 illustrates the LBT operation 508 occurring during a symbol duration of the DMRS 510, the LBT operation 508 may occur at other times that non-overlap with the DMRS 510 symbol duration.

The UE2 may determine whether the channel activity corresponds to the PDSCH 506 based on the one or more measurements of the DMRS 510 within the channel activity. For example, the UE2 may demodulate the a sensed signal using the DMRS 510 to determine whether the sensed signal is a PDSCH from the BS. In some aspects, the UE2 may determine an amount of energy associated with the channel activity and a radio frequency measurement of the DMRS 510 within the channel activity. The UE2 may compare the amount of energy associated with the channel activity to the RF measurement of the DMRS 510 to determine whether the channel activity energy corresponds to the DMRS measurement. If both measurements correspond to one another, then UE2 may transmit the PUSCH 504 (even during transmission of the PDSCH 506) without wasting resources. In some examples, the amount of channel activity energy may be consistent with the amount of energy of the DMRS.

Figure 6:
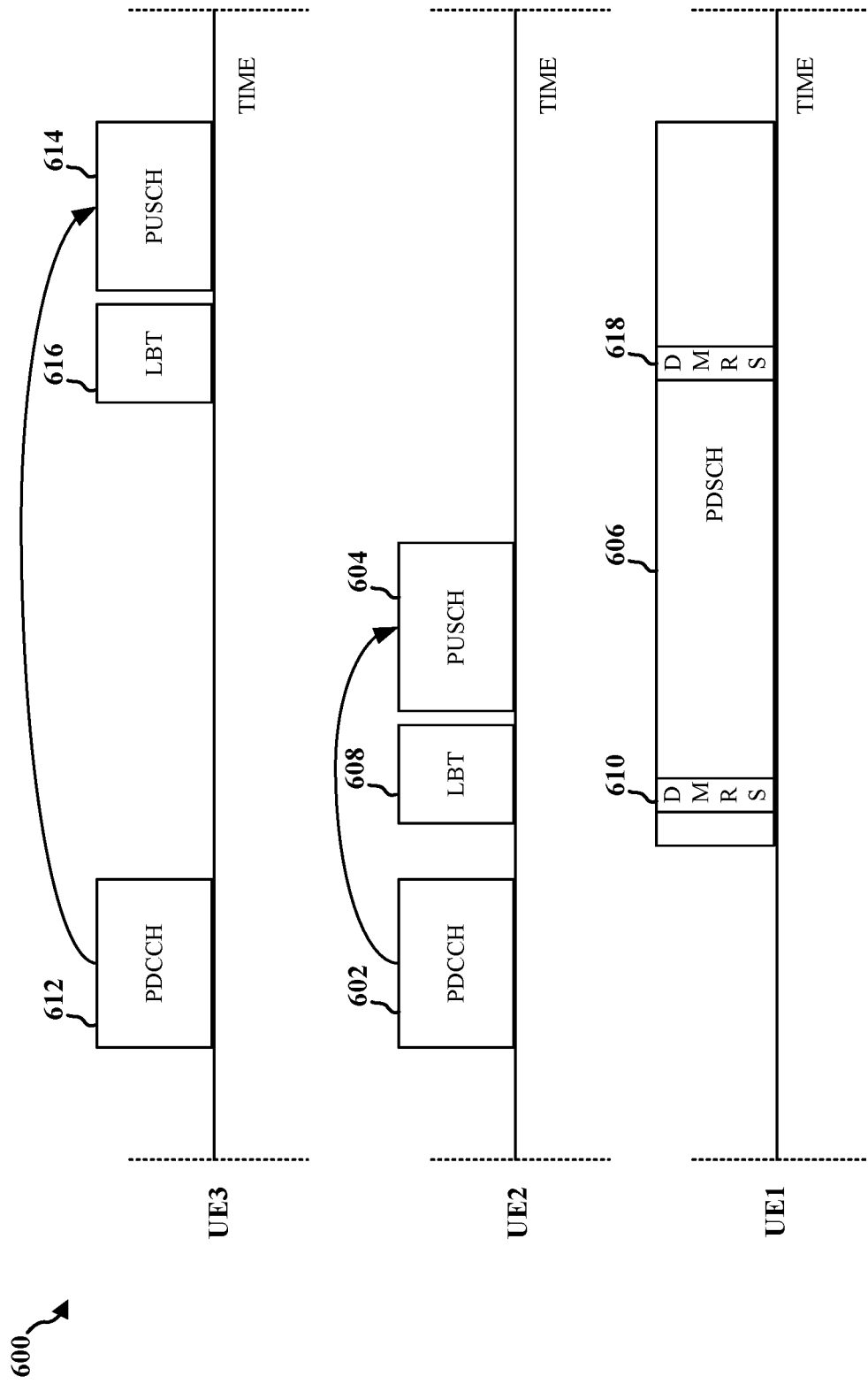
FIG. 6 is a diagram illustrating another example of a timeline in a communication flow with DMRS-assisted LBT for full-duplex wireless communications, in accordance with various aspects of the present disclosure.

FIG. 6 is a diagram illustrating another example of a timeline 600 in a group-based communication flow with DMRS-assisted LBT for full-duplex wireless communications, in accordance with various aspects of the present disclosure. As depicted in FIG. 6, the timeline 600 illustrates communications between a base station (e.g., BS 102/180) and a first UE (UE1) and between the base station and a second UE (UE2). In contrast to FIG. 5, the group-based communication flow illustrated in FIG. 6 facilitates a groupcast transmission of a DMRS configuration to UE2 and UE3. In timeline 600, the base station can transmit a PDCCH 602 to UE2 indicating resources for UE2 to transmit PUSCH 604. The base station also can transmit a PDSCH 406 to UE1 that at least partially overlaps PUSCH 604 in time and/or frequency, such that when UE2 performs an LBT operation for transmitting PUSCH 604, UE2 may sense signal energy from the base station transmitting PDSCH 606.

In one or more implementations, the PDSCH 606 may include a plurality of DMRS symbol durations (e.g., 610, 618). In this regard, the control information may include a first DMRS configuration specifying a first DMRS symbol duration (e.g., DMRS 610) of the plurality of DMRS symbol durations during which the UE1 may perform a first LBT operation 608 and a second DMRS symbol duration (e.g., DMRS 618) of the plurality of DMRS symbol durations during which a third UE (e.g., UE3) may perform a second LBT operation 616. The BS 102/180 may determine whether the PDSCH 606 overlaps a plurality of uplink transmissions associated with a plurality of UEs (e.g., PUSCH 604, PUSCH 614). In this regard, the BS 102/180 may select a first group common (GC)-PDCCH of a plurality of GC-PDCCHs for transmission of the control information to the UE2 and UE3 when the PDSCH 606 is determined to overlap the PUSCH 604 and the PUSCH 614.

In some implementations, the UE2 performs an LBT operation 608 for transmitting PUSCH 604. The UE2 may sense signal energy from the base station transmitting PDSCH 606. For example, the UE2 may obtain one or more measurements of the DMRS 610 within the sensed channel activity occupying the same band as the PUSCH 604 based on the DMRS configuration. In some aspects, the LBT operation 608 may be performed immediately prior to the transmission of the PUSCH 604. In other aspects, the LBT operation 608 may be performed at a predetermined time prior to the transmission of the PUSCH 604. Although FIG. 6 illustrates the LBT operation 608 occurring during a symbol duration of the DMRS 610, the LBT operation 608 may occur at other times that non-overlap with the DMRS 610 symbol duration.

In some implementations, the UE3 performs an LBT operation 616 for transmitting PUSCH 614. The UE3 may sense signal energy from the base station transmitting PDSCH 606. For example, the UE3 may obtain one or more measurements of the DMRS 618 within the sensed channel activity occupying the same band as the PUSCH 614 based on the DMRS configuration. In some aspects, the LBT operation 616 may be performed immediately prior to the transmission of the PUSCH 614. In other aspects, the LBT operation 616 may be performed at a predetermined time prior to the transmission of the PUSCH 614. Although FIG. 6 illustrates the LBT operation 616 occurring during a symbol duration of the DMRS 618, the LBT operation 616 may occur at other times that non-overlap with the DMRS 618 symbol duration.

The UE2 may determine whether the channel activity corresponds to the PDSCH 606 based on the one or more measurements of the DMRS 610 within the channel activity. In some aspects, the UE2 may determine an amount of energy associated with the channel activity and a radio frequency measurement of the DMRS 610 within the channel activity. The UE2 may compare the amount of energy associated with the channel activity to the RF measurement of the DMRS 610 to determine whether the channel activity energy corresponds to the DMRS measurement. If both measurements correspond to one another, then UE2 may transmit the PUSCH 604 (even during transmission of the PDSCH 606) without wasting resources.

The UE3 may determine whether the channel activity corresponds to the PDSCH 606 based on the one or more measurements of the DMRS 618 within the channel activity. In some aspects, the UE3 may determine an amount of energy associated with the channel activity and a radio frequency measurement of the DMRS 618 within the channel activity. The UE3 may compare the amount of energy associated with the channel activity to the RF measurement of the DMRS 618 to determine whether the channel activity energy corresponds to the DMRS measurement. If both measurements correspond to one another, then UE3 may transmit the PUSCH 614 (even during transmission of the PDSCH 606) without wasting resources.

Figure 7:
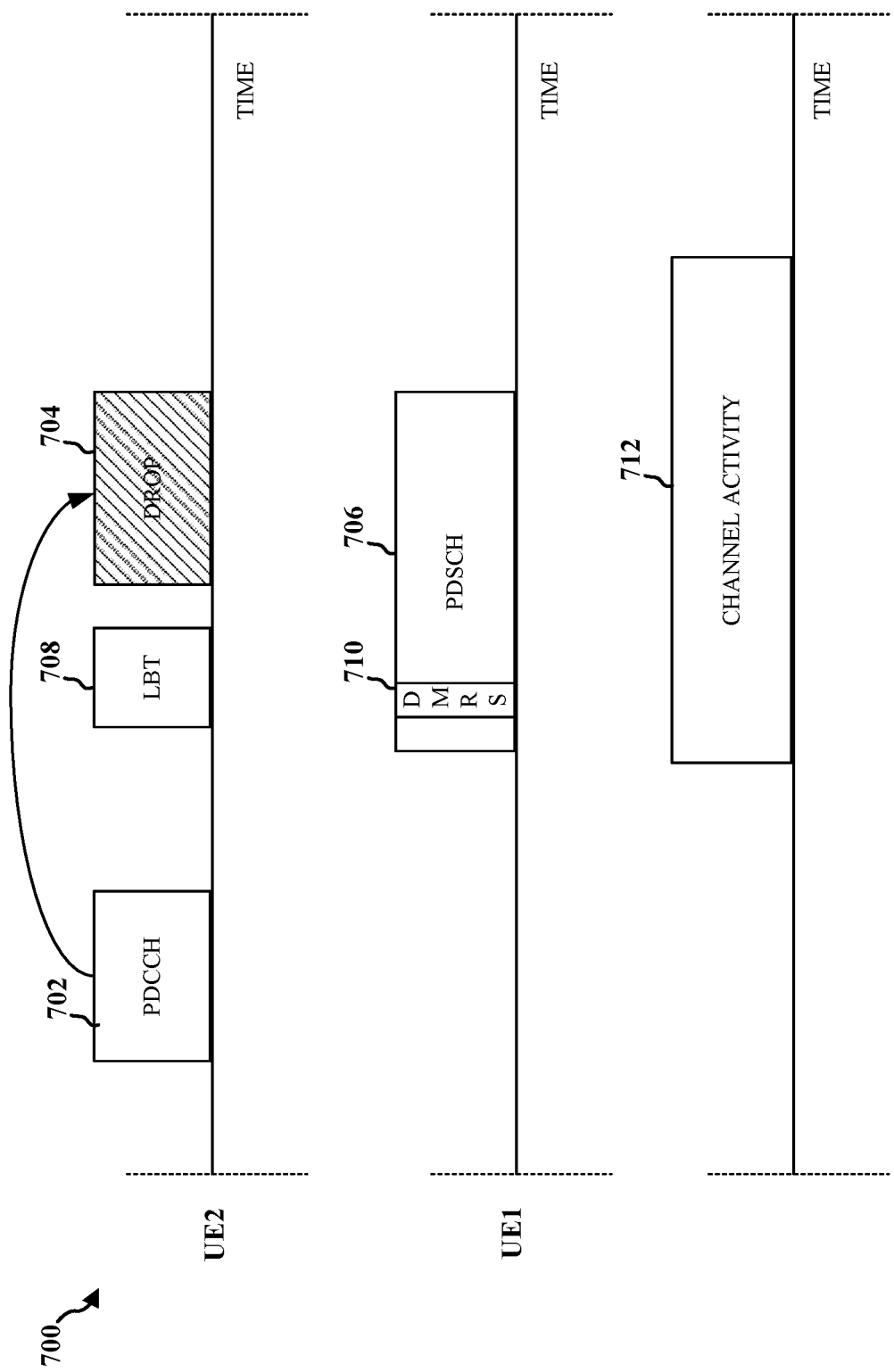
FIG. 7 is a diagram illustrating an example of a timeline in a communication flow with DMRS-assisted LBT for full-duplex wireless communications, in accordance with various aspects of the present disclosure.

FIG. 7 is a diagram illustrating an example of a timeline 700 in a communication flow with DMRS-assisted LBT for full-duplex wireless communications, in accordance with various aspects of the present disclosure. The communication flow in the timeline 700 includes a dropped PUSCH transmission based on sensed channel activity that does not correspond solely to a PDSCH transmission originating from the same base station (intending to receive the PUSCH transmission) but rather other inter-cell downlink transmissions. As depicted in FIG. 7, the timeline 700 illustrates communications between a base station (e.g., BS 102/180) and a first UE (UE1) and between the base station and a second UE (UE2). In timeline 700, the base station can transmit a PDCCH 702 to UE2 indicating resources for UE2 to transmit PUSCH 704. The base station also can transmit a PDSCH 406 to UE1 that at least partially overlaps PUSCH 704 in time and/or frequency, such that when UE2 performs an LBT operation for transmitting PUSCH 704, UE2 may sense signal energy from the base station transmitting PDSCH 706.

In some implementations, the UE2 performs an LBT operation 708 for transmitting PUSCH 704. The UE2 may sense signal energy from the base station transmitting PDSCH 706. For example, the UE2 may obtain one or more measurements of the DMRS 710 within the sensed channel activity occupying the same band as the PUSCH 704 based on the DMRS configuration. In some aspects, the LBT operation 708 may be performed immediately prior to the transmission of the PUSCH 704. In other aspects, the LBT operation 708 may be performed at a predetermined time prior to the transmission of the PUSCH 704. Although FIG. 7 illustrates the LBT operation 708 occurring during a symbol duration of the DMRS 710, the LBT operation 708 may occur at other times that non-overlap with the DMRS 710 symbol duration.

The UE2 may determine whether the channel activity corresponds to the PDSCH 706 based on the one or more measurements of the DMRS 710 within the channel activity. In some aspects, the UE2 may determine an amount of energy associated with the channel activity and a radio frequency measurement of the DMRS 710 within the channel activity. The UE2 may compare the amount of energy associated with the channel activity to the RF measurement of the DMRS 710 to determine whether the channel activity energy corresponds to the DMRS measurement. In some aspects, the UE2 may determine whether the amount of energy associated with the channel activity exceeds the measurement of the DMRS within the channel activity by a predetermined threshold. As depicted in FIG. 7, the PDSCH 706 and channel activity 712 may occupy the same band as the PUSCH 704. In some examples, the channel activity 712 may fully overlap the PDSCH 706 (or the PDSCH 706 may partially overlap the channel activity 712). In this regard, the UE2 may determine that the channel activity does not correspond to the downlink transmission associated with the second UE based on a determination that the amount of energy associated with the channel activity exceeds the measurement of the DMRS within the channel activity by the predetermined threshold. For example, the obtained measurements include the sensed channel activity energy and the DMRS energy, of which the sum of the detected energy exceeds the DMRS measurement. If the detected channel activity energy does not correspond to the DMRS measurement, then UE2 may refrain from transmitting the PUSCH 704 to avoid interference and/or collision with the PUSCH 704. As illustrated in FIG. 7, the UE2 may drop the PUSCH 704.

Figure 8:
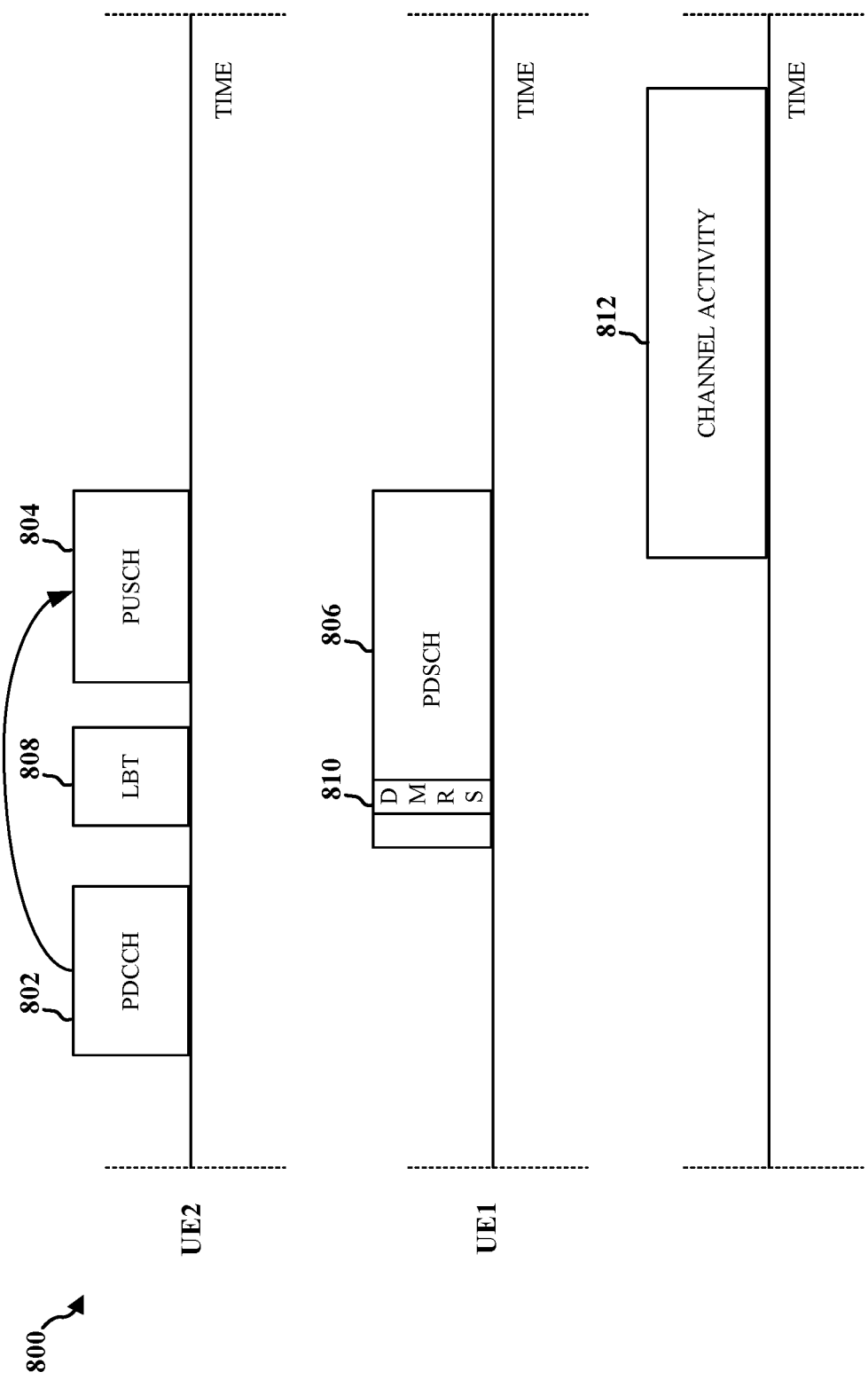
FIG. 8 is a diagram illustrating another example of a timeline in a communication flow with DMRS-assisted LBT for full-duplex wireless communications, in accordance with various aspects of the present disclosure.

FIG. 8 is a diagram illustrating another example of a timeline 800 in a communication flow with DMRS-assisted LBT for full-duplex wireless communications, in accordance with various aspects of the present disclosure. In contrast to FIG. 7, the communication flow in the timeline 700 includes a PUSCH transmission based on sensed channel activity that does correspond to a PDSCH transmission originating from the same base station (intending to receive the PUSCH transmission). As depicted in FIG. 8, the timeline 800 illustrates communications between a base station (e.g., BS 102/180) and a first UE (UE1) and between the base station and a second UE (UE2). In timeline 800, the base station can transmit a PDCCH 802 to UE2 indicating resources for UE2 to transmit PUSCH 804. The base station also can transmit a PDSCH 406 to UE1 that at least partially overlaps PUSCH 804 in time and/or frequency, such that when UE2 performs an LBT operation for transmitting PUSCH 804, UE2 may sense signal energy from the base station transmitting PDSCH 806.

In some implementations, the UE2 performs an LBT operation 808 for transmitting PUSCH 804. The UE2 may sense signal energy from the base station transmitting PDSCH 806. For example, the UE2 may obtain one or more measurements of the DMRS 810 within the sensed channel activity occupying the same band as the PUSCH 804 based on the DMRS configuration. In some aspects, the LBT operation 808 may be performed immediately prior to the transmission of the PUSCH 804. In other aspects, the LBT operation 808 may be performed at a predetermined time prior to the transmission of the PUSCH 804. Although FIG. 8 illustrates the LBT operation 808 occurring during a symbol duration of the DMRS 810, the LBT operation 808 may occur at other times that non-overlap with the DMRS 810 symbol duration.

The UE2 may determine whether the channel activity corresponds to the PDSCH 806 based on the one or more measurements of the DMRS 810 within the channel activity. In some aspects, the UE2 may determine an amount of energy associated with the channel activity and a radio frequency measurement of the DMRS 810 within the channel activity. The UE2 may compare the amount of energy associated with the channel activity to the RF measurement of the DMRS 810 to determine whether the channel activity energy corresponds to the DMRS measurement. In some aspects, the UE2 may determine whether the amount of energy associated with the channel activity exceeds the measurement of the DMRS within the channel activity by a predetermined threshold. As depicted in FIG. 8, the PDSCH 806 and channel activity 812 may partially occupy the same band as the PUSCH 804, however, the communication medium is available during most symbol durations of the PUSCH 804 scheduled transmission. In some examples, the channel activity 812 may partially overlap the PDSCH 806 (or the PDSCH 806 may partially overlap the channel activity 812). In this regard, the UE2 may determine that the channel activity corresponds to the downlink transmission associated with the second UE based on a determination that the amount of energy associated with the channel activity does not exceed the measurement of the DMRS within the channel activity by the predetermined threshold. In some aspects, the UE2 may infer that the channel activity energy corresponds to the DMRS measurement. If both measurements correspond to one another, then UE2 may transmit the PUSCH 804 (even during transmission of the PDSCH 806) without wasting resources.

Figure 9:
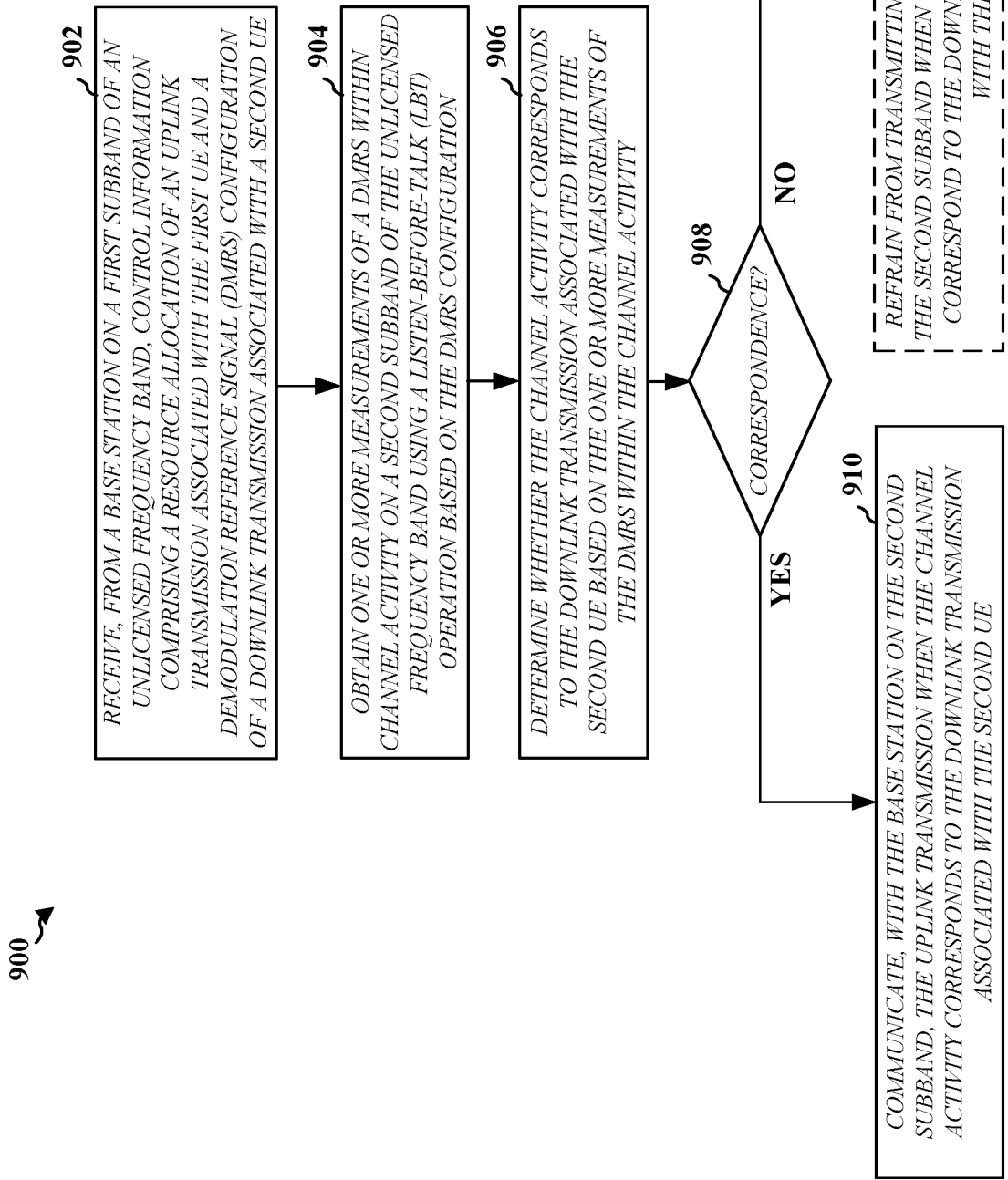
FIG. 9 is a flow chart illustrating an example of a process for DMRS-assisted LBT for full-duplex wireless communications at a user equipment, in accordance with various aspects of the present disclosure.

FIG. 9 is a flow chart illustrating an example of a process 900 for DMRS-assisted LBT for full-duplex wireless communications at a user equipment, in accordance with various aspects of the present disclosure. The process 900 may be performed by a user equipment or a component of a user equipment (e.g., the UE 104, 350, which may include the memory 360 and which may be the entire UE 350 or a component of the UE 350, such as the TX processor 368, the RX processor 356, and/or the controller/processor 359). According to various aspects, one or more of the illustrated operations of the process 900 may be omitted, transposed, and/or contemporaneously performed.

At 902, a first UE may receive, from the base station on a first subband of an unlicensed frequency band, control information comprising a resource allocation of an uplink transmission associated with the first UE and a demodulation reference signal (DMRS) configuration of a downlink transmission associated with a second UE. In some aspects, the DMRS configuration includes one or more of a location of the DMRS in time and frequency, a precoder associated with the DMRS, or a transmission power of the DMRS in the downlink transmission. For example, 902 may be performed by reception component 1004 of FIG. 10. In the context of FIGS. 1 and 3, for example, the UE 104/350 may receive the control information. In some aspects, the first UE may determine that the uplink transmission is scheduled during a same time and frequency resource as the downlink transmission associated with the second UE based on the resource allocation and the DMRS configuration. The first UE may obtain information of the DMRS that indicates one or more of a location of the DMRS in time and frequency, a precoder associated with the DMRS or a transmission power of the DMRS in the downlink transmission.

At 904, the first UE may obtain one or more measurements of a DMRS within channel activity on a second subband of the unlicensed frequency band using an LBT operation based on the DMRS configuration. For example, 904 may be performed by LBT component 1008 of FIG. 10. In the context of FIGS. 1 and 3, for example, the UE 104/350 may obtain the one or more measurements of the DMRS. In some aspects, the first UE may determine an amount of energy associated with the channel activity and a measurement of the DMRS within the channel activity.

At 906, the first UE may determine whether the channel activity corresponds to the downlink transmission associated with the second UE based on the one or more measurements of the DMRS within the channel activity. For example, 906 may be performed by determination component 1010 of FIG. 10. In the context of FIGS. 1 and 3, for example, the UE 104/350 may determine whether the channel activity corresponds to the downlink transmission.

At 908, the first UE performs the comparison operation. If the channel activity is determined to correspond to the downlink transmission, then the process 900 proceeds to block 910. Otherwise, the process 900 proceeds to block 912. For example, 908 may be performed by the determination component 1010 of FIG. 10. In the context of FIGS. 1 and 3, for example, the UE 104/350 may compare the DMRS measurement to the channel activity measured energy. In some aspects, the first UE may determine whether the amount of energy associated with the channel activity exceeds the measurement of the DMRS within the channel activity by a predetermined threshold. The first UE may determine that the channel activity corresponds to the downlink transmission associated with the second UE when the amount of energy associated with the channel activity does not exceed the measurement of the DMRS within the channel activity by the predetermined threshold. The first UE also may determine that the channel activity does not correspond to the downlink transmission associated with the second UE when the amount of energy associated with the channel activity exceeds the measurement of the DMRS within the channel activity by the predetermined threshold.

At 910, the first UE may communicate, with the base station on the second subband, the uplink transmission when the channel activity corresponds to the downlink transmission associated with the second UE. For example, 910 may be performed by transmission component 1006 of FIG. 10. In the context of FIGS. 1 and 3, for example, the UE 104/350 may communicate the uplink transmission.

At 912, the first UE may refrain from transmitting the uplink transmission on the second subband when the channel activity does not correspond to the downlink transmission associated with the second UE. In some aspects, the first UE may drop the uplink transmission. In other aspects, the first UE may delay the transmission of the uplink transmission until the communication medium is available (e.g., after transmission of the downlink transmission associated with the second UE). In some aspects, the refraining is based on a configuration of the first UE. In other aspects, the refraining is based on an indication included in the control information. For example, 912 may be performed by the transmission component 1006 of FIG. 10. In the context of FIGS. 1 and 3, for example, the UE 104/350 may refrain from transmitting the uplink transmission.

Figure 10:
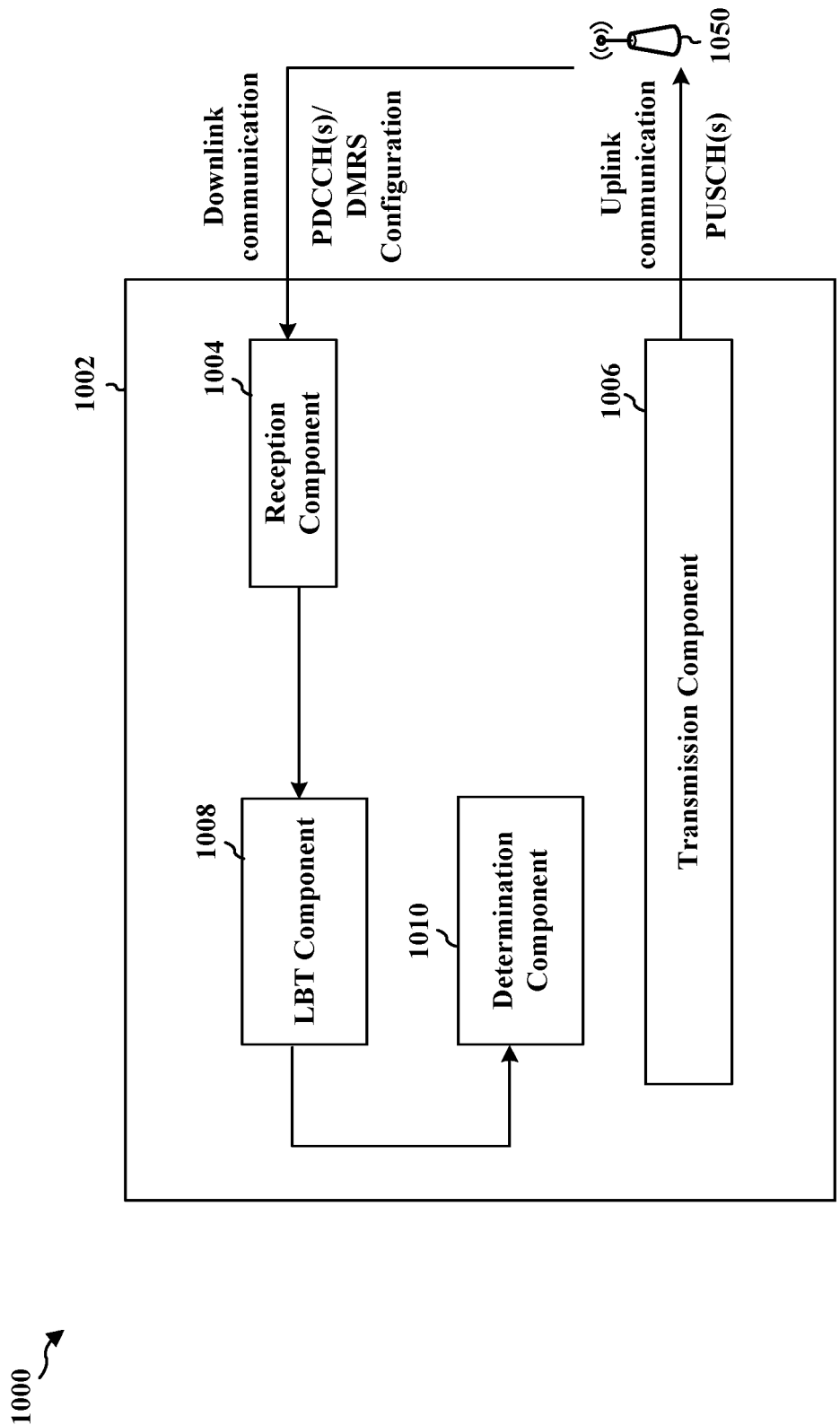
FIG. 10 is a conceptual data flow diagram illustrating the data flow between different components in an example apparatus in accordance with some aspects of the present disclosure.

FIG. 10 is a conceptual data flow diagram 1000 illustrating the data flow between different means/components in an example apparatus 1002. The apparatus 1002 may be a UE or a component of a UE (e.g., such as UE 104, 350). The apparatus 1002 may include a reception component 1004, a transmission component 1006, an LBT component 1008, and a determination component 1010.

The reception component 1004 may be configured to receive signals and/or other information from other devices including, e.g., base station 1050. The signals/information received by the reception component 1004 may be provided to one or more components of the apparatus 1002 for further processing and use in performing various operations in accordance with the methods discussed supra including the process 900. Thus, via the reception component 1004, the apparatus 1002 and/or one or more components therein receive signals and/or other information (e.g., such as data for the apparatus 1002, downlink control information, DMRS configuration and/or other control signaling) from the base station 1050 as discussed supra and also discussed more specifically infra.

The transmission component 1006 may be configured to transmit various messages to one or more external devices, e.g., including the base station 1050, in accordance with the methods disclosed herein. The messages/signals to be transmitted may be generated by one or more other components as discussed above, or the messages/signals to be transmitted may be generated by the transmission component 1006 under the direction/control of the one or more other components discussed supra. Thus, in various configurations, via the transmission component 1006, the apparatus 1002 and/or one or more components therein transmit signals and/or other information (e.g., such as uplink communication and/or other signals) to external devices such as the base station 1050.

In some implementations, the LBT component 1008 may be configured to obtain one or more measurements of a DMRS within channel activity on a second subband of the unlicensed frequency band using an LBT operation based on the DMRS configuration, e.g., as described in connection with block 904 of FIG. 9. In some aspects, the LBT component 1008 may determine an amount of energy associated with the channel activity and a measurement of the DMRS within the channel activity.

The determination component 1010 may be configured to determine whether the channel activity corresponds to the downlink transmission associated with the second UE based on the one or more measurements of the DMRS within the channel activity, e.g., as described in connection with block 908 of FIG. 9. In some aspects, the determination component 1010 may determine whether the amount of energy associated with the channel activity exceeds the measurement of the DMRS within the channel activity by a predetermined threshold. The determination component 1010 may determine that the channel activity corresponds to the downlink transmission associated with the second UE when the amount of energy associated with the channel activity does not exceed the measurement of the DMRS within the channel activity by the predetermined threshold. The determination component 1010 also may determine that the channel activity does not correspond to the downlink transmission associated with the second UE when the amount of energy associated with the channel activity exceeds the measurement of the DMRS within the channel activity by the predetermined threshold.

The apparatus 1002 may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
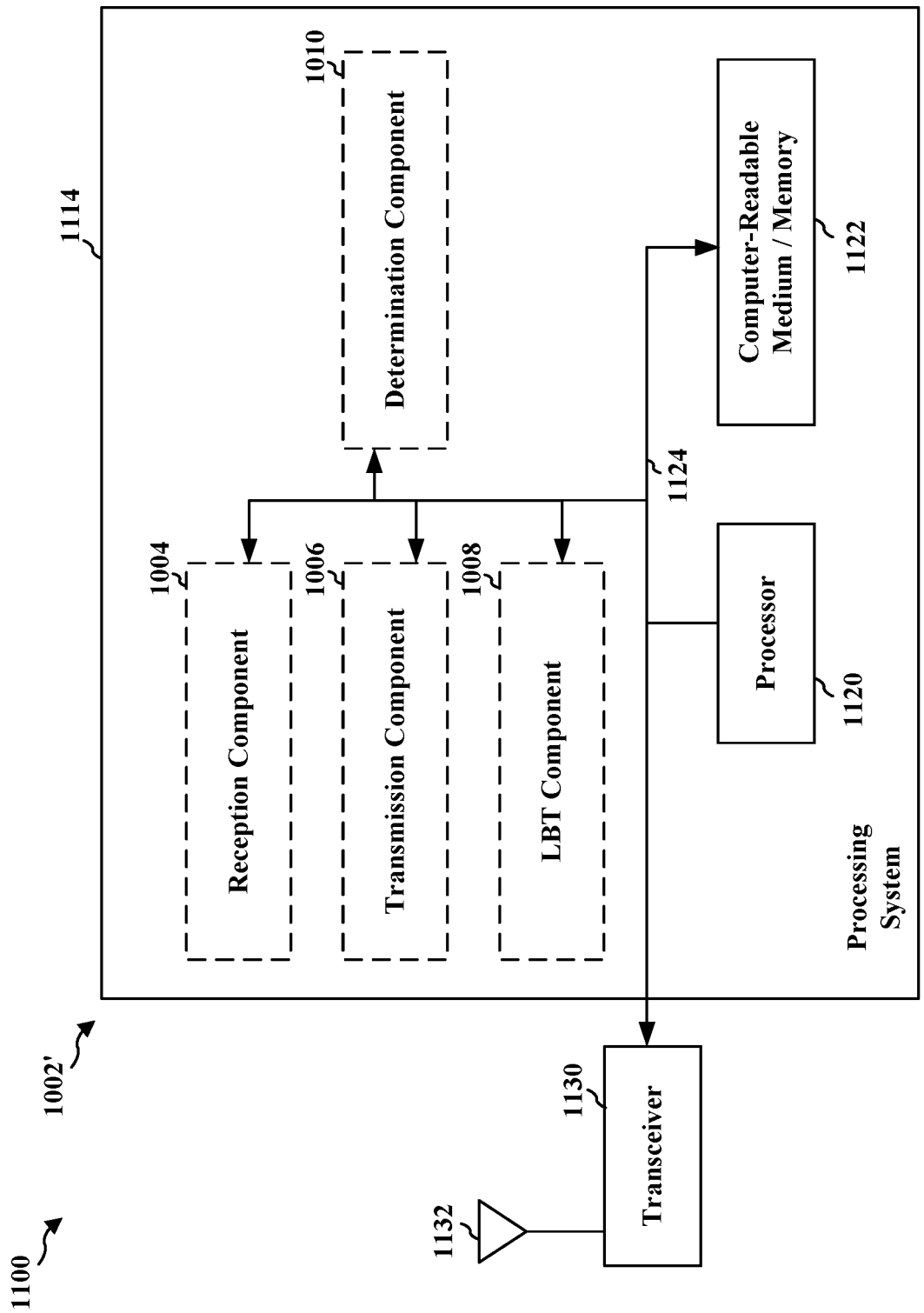
FIG. 11 is a diagram illustrating an example of a hardware implementation for an apparatus employing a processing system in accordance with some aspects of the present disclosure.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010 and the computer-readable medium/memory 1122. The bus 1124 may also link various other circuits such as timing sources, peripherals, voltage regulators, and power management circuits, which are well known in the art, and therefore, will not be described any further.

The processing system 1114 may be coupled to a transceiver 1130. The transceiver 1130 is coupled to one or more antennas 1132. The transceiver 1130 provides a means for communicating with various other apparatus over a transmission medium. The transceiver 1130 receives a signal from the one or more antennas 1132, extracts information from the received signal, and provides the extracted information to the processing system 1114, specifically the reception component 1004. In addition, the transceiver 1130 receives information from the processing system 1114, specifically the transmission component 1016, and based on the received information, generates a signal to be applied to the one or more antennas 1132. The processing system 1114 includes a processor 1120 coupled to a computer-readable medium/memory 1122. The processor 1120 is responsible for general processing, including the execution of software stored on the computer-readable medium/memory 1122. The software, when executed by the processor 1120, causes the processing system 1114 to perform the various functions described supra for any particular apparatus. The computer-readable medium/memory 1122 may also be used for storing data that is manipulated by the processor 1120 when executing software. The processing system 1114 further includes at least one of the components 1004, 1006, 1008, 1010. The components may be software components running in the processor 1120, resident/stored in the computer-readable medium/memory 1122, one or more hardware components coupled to the processor 1120, or some combination thereof. The processing system 1114 may be a component of the UE 350 and may include the memory 360 and/or at least one of the TX processor 368, the RX processor 356, and the controller/processor 359. Alternatively, the processing system 1114 may be the entire UE (e.g., see 350 of FIG. 3).

In one configuration, the apparatus 1002/1002' is a UE for wireless communication including means for receiving, from a base station on a first subband of an unlicensed frequency band, control information comprising a resource allocation of an uplink transmission associated with the first UE and a demodulation reference signal (DMRS) configuration of a downlink transmission associated with a second UE. The apparatus 1002/1002' also includes means for obtaining one or more measurements of a DMRS within channel activity on a second subband of the unlicensed frequency band using a listen-before-talk (LBT) operation based on the DMRS configuration. The apparatus 1002/1002' also includes means for communicating, with the base station on the second subband, the uplink transmission when the channel activity corresponds to the downlink transmission associated with the second UE based on the one or more measurements of the DMRS within the channel activity.

The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 12:
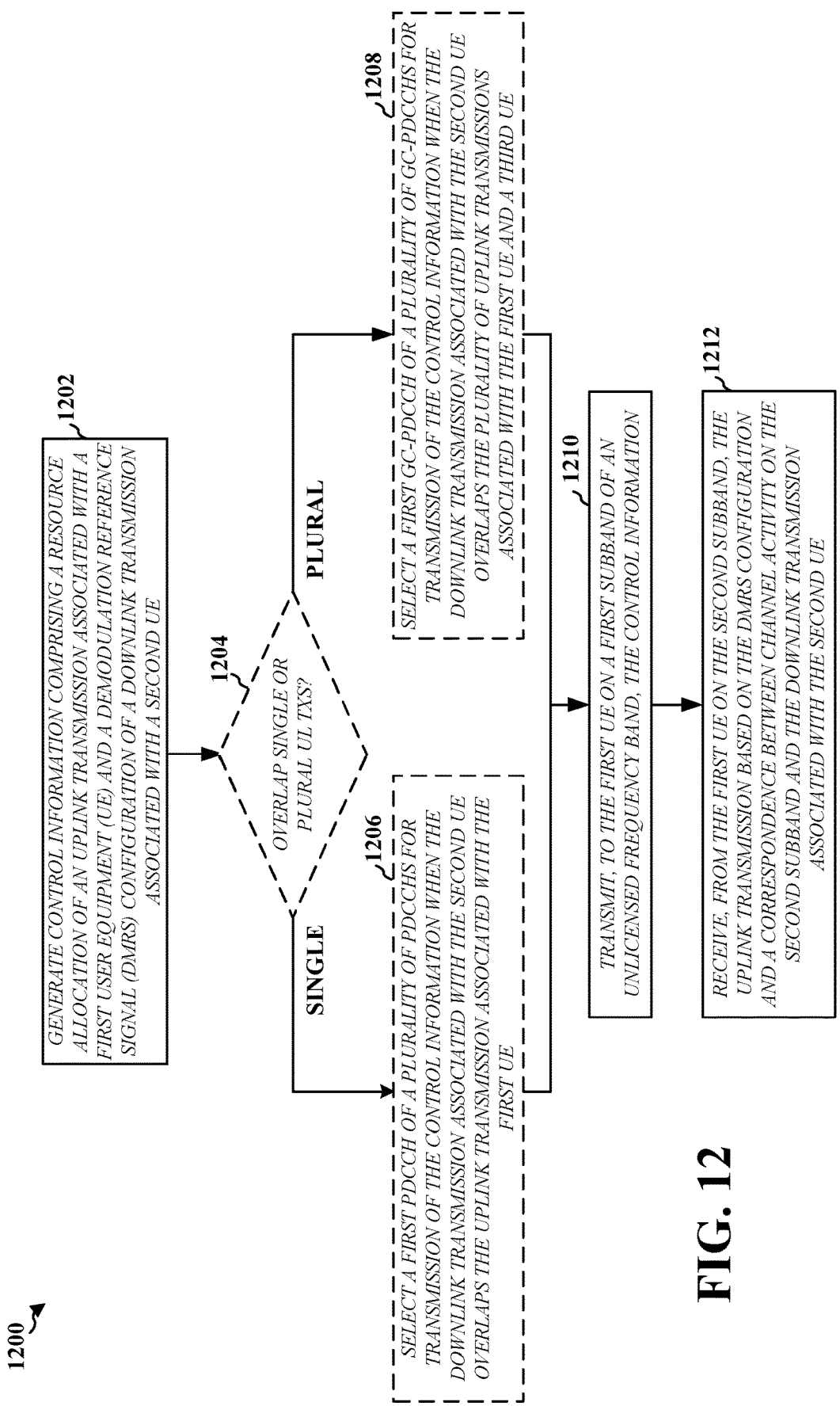
FIG. 12 is a flow chart illustrating an example of a process for DMRS-assisted LBT for full-duplex wireless communications at a base station, in accordance with various aspects of the present disclosure.

FIG. 12 is a flow chart illustrating an example of a process 1200 for DMRS-assisted LBT for full-duplex wireless communications at a base station, in accordance with various aspects of the present disclosure. The process 1200 may be performed by a base station or a component of a base station (e.g., the base station 102, 108, 310, which may include the memory 360 and which may be the entire base station 310 or a component of the base station 310, such as the TX processor 368, the RX processor 356, and/or the controller/processor 359). According to various aspects, one or more of the illustrated operations of the process 1200 may be omitted, transposed, and/or contemporaneously performed.

At 1202, the base station may generate control information comprising a resource allocation of an uplink transmission associated with a first UE and a DMRS configuration of a downlink transmission associated with a second UE. For example, 1202 may be performed by reception component 1304 of FIG. 13. In the context of FIGS. 1 and 3, for example, the BS 102/180/310 may receive the uplink transmission.

At 1204, the base station may determine whether the downlink transmission associated with the second UE overlaps a single uplink transmission associated with the first UE or a plurality of uplink transmissions associated with a plurality of UEs (including the first UE). If the downlink transmission overlaps a single uplink transmission, then the process 1200 proceeds to block 1206. Otherwise, the process 1200 proceeds to block 1208 when the downlink transmission overlaps with a plurality of uplink transmissions. For example, 1204 may be performed by determination component 1310 of FIG. 13. In the context of FIGS. 1 and 3, for example, the BS 102/180/310 may determine whether the downlink transmission overlaps a single uplink transmission or a plurality of uplink transmissions.

At 1206, the base station may select a first PDCCH of a plurality of PDCCHs for transmission of the control information when the downlink transmission associated with the second UE overlaps the uplink transmission associated with the first UE. For example, 1206 may be performed by selection component 1312 of FIG. 13. In the context of FIGS. 1 and 3, for example, the BS 102/180/310 may select the first PDCCH.

At 1208, the base station may select a first GC-PDCCH of a plurality of GC-PDCCHs for transmission of the control information when the downlink transmission associated with the second UE overlaps the plurality of uplink transmissions associated with the first UE and a third UE. For example, 1208 may be performed by the selection component 1312 of FIG. 13. In the context of FIGS. 1 and 3, for example, the BS 102/180/310 may select the first GC-PDCCH. In some aspects, the downlink transmission associated with the second UE may include a plurality of DMRS symbol durations. In this regard, the control information may include a first DMRS configuration specifying a first DMRS symbol duration of the plurality of DMRS symbol durations during which the first UE may perform a first LBT operation and a second DMRS symbol duration of the plurality of DMRS symbol durations during which a third UE may perform a second LBT operation.

At 1210, the base station may transmit, to the first UE on a first subband of an unlicensed frequency band, the control information. For example, 1210 may be performed by configuration component 1314 of FIG. 13 through coordination with transmission component 1306 of FIG. 13. In the context of FIGS. 1 and 3, for example, the BS 102/180/310 may transmit the control information.

At 1212, the base station may receive, from the first UE on the second subband, the uplink transmission based on the DMRS configuration and a correspondence between channel activity on the second subband and the downlink transmission associated with the second UE. For example, 1212 may be performed by reception component 1304 of FIG. 13. In the context of FIGS. 1 and 3, for example, the BS 102/180/310 may receive the uplink transmission.

Figure 13:
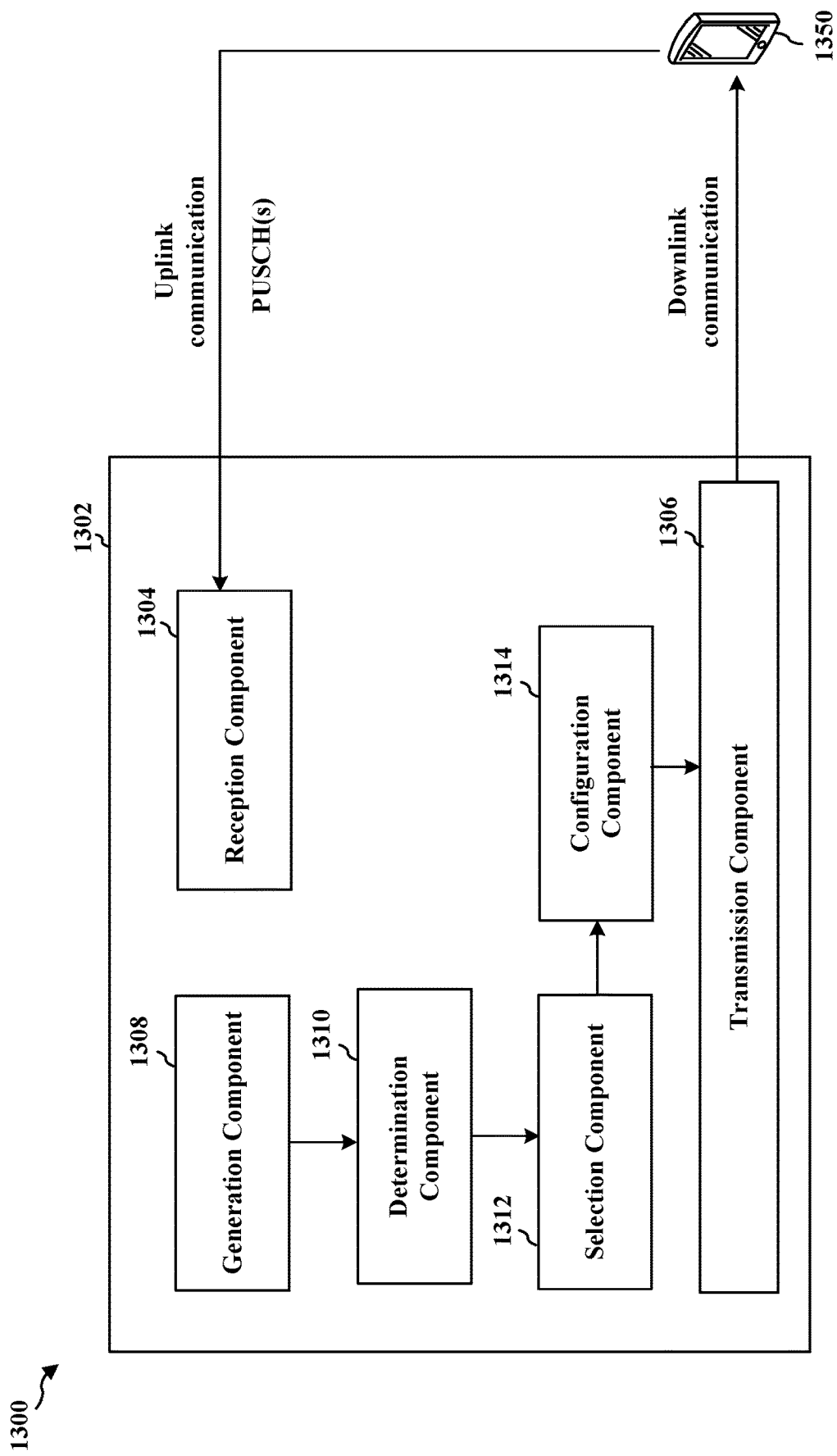
FIG. 13 is a conceptual data flow diagram illustrating the data flow between different components in an example apparatus in accordance with some aspects of the present disclosure.

FIG. 13 is a conceptual data flow diagram 1300 illustrating the data flow between different means/components in an example apparatus 1302. The apparatus 1302 may be a base station or a component of a base station (e.g., such as BS 102/180, 310). The apparatus 1302 may include a reception component 1304, a transmission component 1306, a generation component 1308, a determination component 1310, a selection component 1312 and a configuration component 1314.

The reception component 1304 may be configured to receive signals and/or other information from other devices including, e.g., UE 1350. The signals/information received by the reception component 1304 may be provided to one or more components of the apparatus 1302 for further processing and use in performing various operations in accordance with the methods discussed supra including the process 1200. Thus, via the reception component 1304, the apparatus 1302 and/or one or more components therein receive signals and/or other information (e.g., such as uplink communication and/or other signals) from the UE 1350 as discussed supra and also discussed more specifically infra. In some implementations, the reception component 1304 may be configured to receive, from the first UE on the second subband, the uplink transmission based on the DMRS configuration and a correspondence between channel activity on the second subband and the downlink transmission associated with the second UE, e.g., as described in connection with block 1212 of FIG. 12.

The transmission component 1306 may be configured to transmit various messages to one or more external devices, e.g., including the UE 1350, in accordance with the methods disclosed herein. The messages/signals to be transmitted may be generated by one or more other components as discussed above, or the messages/signals to be transmitted may be generated by the transmission component 1306 under the direction/control of the one or more other components discussed supra. Thus, in various configurations, via the transmission component 1306, the apparatus 1302 and/or one or more components therein transmit signals and/or other information (e.g., such as downlink control information, DMRS configuration signaling and/or other control signals) to external devices such as the UE 1350. In some implementations, the transmission component 1306 may be configured to transmit, to the first UE on a first subband of an unlicensed frequency band, the control information, e.g., as described in connection with block 1210 of FIG. 12.

In some implementations, the generation component 1308 may be configured to generate control information comprising a resource allocation of an uplink transmission associated with a first UE and a DMRS configuration of a downlink transmission associated with a second UE, e.g., as described in connection with block 1202 of FIG. 12.

In some implementations, the determination component 1310 may be configured to determine whether the downlink transmission associated with the second UE overlaps a single uplink transmission associated with the first UE or a plurality of uplink transmissions associated with a plurality of UEs (including the first UE), e.g., as described in connection with block 1204 of FIG. 12.

In some implementations, the selection component 1312 may be configured to select a first PDCCH of a plurality of PDCCHs for transmission of the control information when the downlink transmission associated with the second UE overlaps the uplink transmission associated with the first UE, e.g., as described in connection with block 1206 of FIG. 12. In one or more implementations, the selection component 1312 also may be configured to select a first GC-PDCCH of a plurality of GC-PDCCHs for transmission of the control information when the downlink transmission associated with the second UE overlaps the plurality of uplink transmissions associated with the first UE and a third UE, e.g., as described in connection with block 1208 of FIG. 12.

In some implementations, the configuration component 1314 may be configured to transmit, to the first UE on a first subband of an unlicensed frequency band, the control information, e.g., as described in connection with block 1210 of FIG. 12.

The apparatus 1302 may include additional components that perform each of the blocks of the algorithm in the aforementioned flowchart of FIG. 12. As such, each block in the aforementioned flowchart of FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
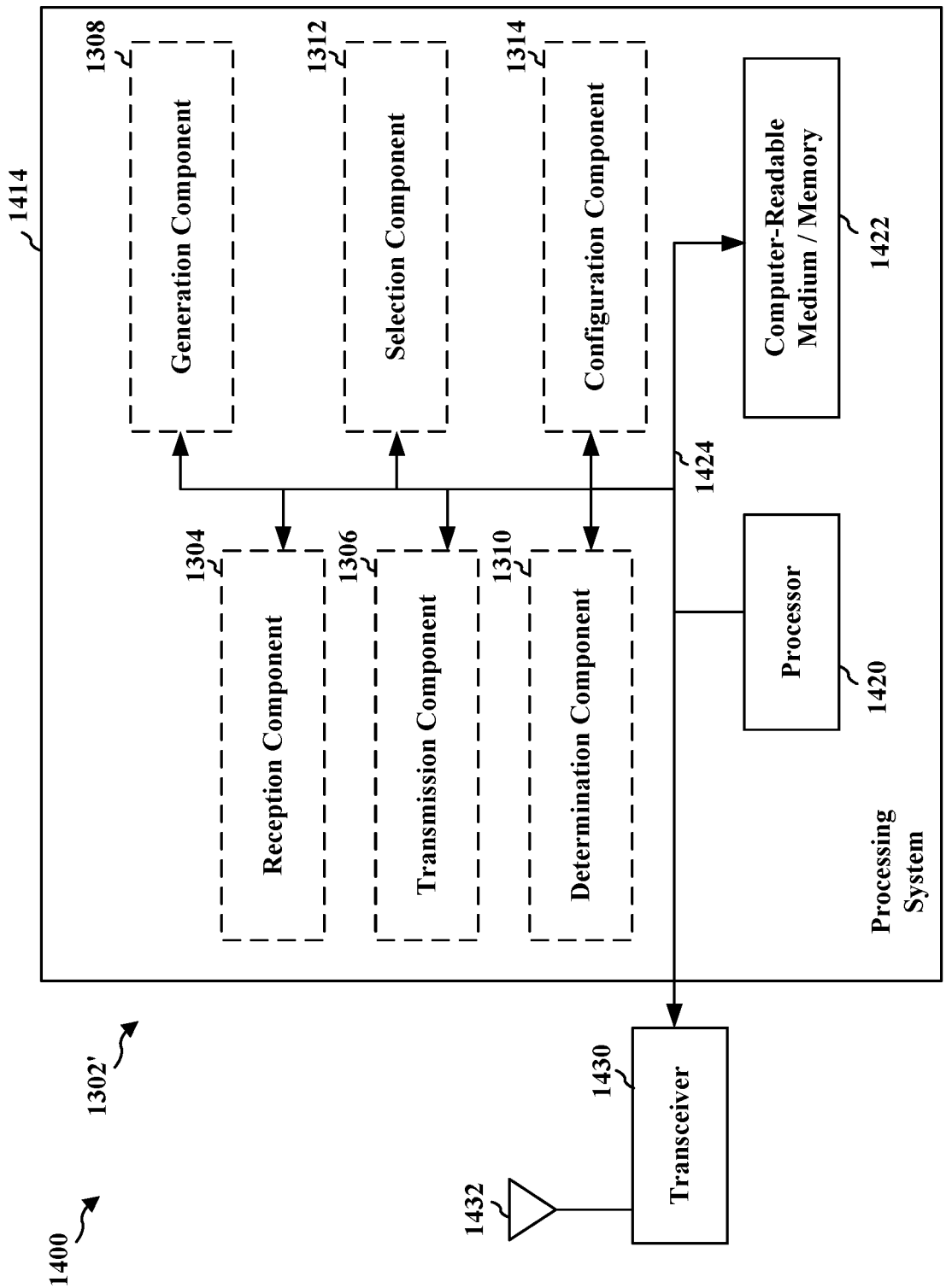
FIG. 14 is a diagram illustrating an example of a hardware implementation for an apparatus employing a processing system in accordance with some aspects of the present disclosure.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1304, 1306, 1308, 1310, 1312, 1314 and the computer-readable medium/memory 1422. The bus 1424 may also link various other circuits such as timing sources, peripherals, voltage regulators, and power management circuits, which are well known in the art, and therefore, will not be described any further.

The processing system 1414 may be coupled to a transceiver 1430. The transceiver 1430 is coupled to one or more antennas 1432. The transceiver 1430 provides a means for communicating with various other apparatus over a transmission medium. The transceiver 1430 receives a signal from the one or more antennas 1432, extracts information from the received signal, and provides the extracted information to the processing system 1414, specifically the reception component 1304. In addition, the transceiver 1430 receives information from the processing system 1414, specifically the transmission component 1306, and based on the received information, generates a signal to be applied to the one or more antennas 1432. The processing system 1414 includes a processor 1420 coupled to a computer-readable medium/memory 1422. The processor 1420 is responsible for general processing, including the execution of software stored on the computer-readable medium/memory 1422. The software, when executed by the processor 1420, causes the processing system 1414 to perform the various functions described supra for any particular apparatus. The computer-readable medium/memory 1422 may also be used for storing data that is manipulated by the processor 1420 when executing software. The processing system 1414 further includes at least one of the components 1304, 1306, 1308, 1310, 1312, 1314. The components may be software components running in the processor 1420, resident/stored in the computer-readable medium/memory 1422, one or more hardware components coupled to the processor 1420, or some combination thereof. The processing system 1414 may be a component of the BS 310 and may include the memory 376 and/or at least one of the TX processor 316, the RX processor 370, and the controller/processor 375. Alternatively, the processing system 1414 may be the entire BS (e.g., see 310 of FIG. 3).

In one configuration, the apparatus 1302/1302' is a UE for wireless communication including means for generating control information comprising a resource allocation of an uplink transmission associated with a first UE and a DMRS configuration of a downlink transmission associated with a second UE. The apparatus 1302/1302' also includes means for transmitting, to the first UE on a first subband of an unlicensed frequency band, the control information. The apparatus 1302/1302' also includes means for receiving, from the first UE on the second subband, the uplink transmission based on the DMRS configuration and a correspondence between channel activity on the second subband and the downlink transmission associated with the second UE.

The aforementioned means may be one or more of the aforementioned components of the apparatus 1302 and/or the processing system 1414 of the apparatus 1302' configured to perform the functions recited by the aforementioned means. As described supra, the processing system 1414 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communication at a first user equipment (UE), the apparatus comprising:
at least one processor;
a transceiver; and
a memory, coupled to the at least one processor and the transceiver, storing instructions, which when executed by the at least one processor, cause the apparatus to:
receive, from a base station on a first subband of an unlicensed frequency band, via the transceiver, control information comprising a resource allocation of an uplink transmission associated with the first UE and a demodulation reference signal (DMRS) configuration of a downlink transmission associated with a second UE;
obtain one or more measurements of a DMRS within channel activity on a second subband of the unlicensed frequency band using a listen-before-talk (LBT) operation based on the DMRS configuration; and
communicate, with the base station on the second subband, via the transceiver, the uplink transmission when the channel activity corresponds to the downlink transmission associated with the second UE based on the one or more measurements of the DMRS within the channel activity.

2. The apparatus of claim 1, wherein the instructions, which when executed by the at least one processor, further cause the apparatus to refrain from transmitting the uplink transmission on the second subband when the channel activity does not correspond to the downlink transmission associated with the second UE based on the one or more measurements of the DMRS within the channel activity.

3. The apparatus of claim 1, wherein the obtaining the one or more measurements comprises to determine an amount of energy associated with the channel activity and a measurement of the DMRS within the channel activity.

4. The apparatus of claim 3, wherein the instructions, which when executed by the at least one processor, further cause the apparatus to:
determine whether the amount of energy associated with the channel activity exceeds the measurement of the DMRS within the channel activity by a predetermined threshold;
determine that the channel activity corresponds to the downlink transmission associated with the second UE when the amount of energy associated with the channel activity does not exceed the measurement of the DMRS within the channel activity by the predetermined threshold; and
determine that the channel activity does not correspond to the downlink transmission associated with the second UE when the amount of energy associated with the channel activity exceeds the measurement of the DMRS within the channel activity by the predetermined threshold.

5. The apparatus of claim 1, wherein the instructions, which when executed by the at least one processor, further cause the apparatus to:
determine that the uplink transmission is scheduled during a same time and frequency resource as the downlink transmission associated with the second UE based on the resource allocation and the DMRS configuration; and
obtain information of the DMRS that indicates one or more of a location of the DMRS in time and frequency, a precoder associated with the DMRS or a transmission power of the DMRS in the downlink transmission.

6. The apparatus of claim 1, wherein:
the first subband comprises a plurality of group common physical downlink control channels (GC-PDCCHs), multiplexed in time or frequency, and
the receiving the control information comprises to receive, from the base station in a first GC-PDCCH of the plurality of GC-PDCCHs, via the transceiver, the control information.

7. The apparatus of claim 1, wherein:
the second subband comprises a plurality of physical uplink shared channels (PUSCHs), multiplexed in time or frequency, and
the communicating the uplink transmission comprises to transmit, to the base station in a first PUSCH of the plurality of PUSCHs, via the transceiver, an uplink signal using resources included in the resource allocation that at least partially overlap resources of the downlink transmission associated with the second UE.

8. A method of wireless communication at a first user equipment (UE), the method comprising:
receiving, from a base station on a first subband of an unlicensed frequency band, control information comprising a resource allocation of an uplink transmission associated with the first UE and a demodulation reference signal (DMRS) configuration of a downlink transmission associated with a second UE;
obtaining one or more measurements of a DMRS within channel activity on a second subband of the unlicensed frequency band using a listen-before-talk (LBT) operation based on the DMRS configuration; and
communicating, with the base station on the second subband, the uplink transmission when the channel activity corresponds to the downlink transmission associated with the second UE based on the one or more measurements of the DMRS within the channel activity.

9. The method of claim 8, further comprising:
refraining from transmitting the uplink transmission on the second subband when the channel activity does not correspond to the downlink transmission associated with the second UE based on the one or more measurements of the DMRS within the channel activity.

10. The method of claim 9, wherein the refraining is based on a configuration of the first UE.

11. The method of claim 9, wherein the refraining is based on an indication included in the control information.

12. The method of claim 8, wherein the DMRS configuration comprises one or more of a location of the DMRS in time and frequency, a precoder associated with the DMRS, or a transmission power of the DMRS in the downlink transmission.

13. The method of claim 8, wherein the control information comprises an indication of existence or non-existence of the downlink transmission associated with the second UE on at least partially overlapping resources of the uplink transmission associated with the first UE in one or more of time or frequency.

14. The method of claim 8, wherein the obtaining the one or more measurements comprises determining an amount of energy associated with the channel activity and a measurement of the DMRS within the channel activity.

15. The method of claim 14, further comprising:
determining whether the amount of energy associated with the channel activity exceeds the measurement of the DMRS within the channel activity by a predetermined threshold;
determining that the channel activity corresponds to the downlink transmission associated with the second UE when the amount of energy associated with the channel activity does not exceed the measurement of the DMRS within the channel activity by the predetermined threshold; and
determining that the channel activity does not correspond to the downlink transmission associated with the second UE when the amount of energy associated with the channel activity exceeds the measurement of the DMRS within the channel activity by the predetermined threshold.

16. The method of claim 8, further comprising:
determining that the uplink transmission is scheduled during a same time and frequency resource as the downlink transmission associated with the second UE based on the resource allocation and the DMRS configuration; and
obtaining information of the DMRS that indicates one or more of a location of the DMRS in time and frequency, a precoder associated with the DMRS or a transmission power of the DMRS in the downlink transmission.

17. The method of claim 8, wherein:
the first subband comprises a plurality of physical downlink control channels (PDCCHs), multiplexed in time or frequency, and
the receiving the control information comprises receiving, from the base station in a first PDCCH of the plurality of PDCCHs, the control information.

18. The method of claim 8, wherein:
the first subband comprises a plurality of group common physical downlink control channels (GC-PDCCHs), multiplexed in time or frequency, and
the receiving the control information comprises receiving, from the base station in a first GC-PDCCH of the plurality of GC-PDCCHs, the control information.

19. The method of claim 18, wherein:
the downlink transmission associated with the second UE comprises a plurality of DMRS symbol durations, and
the control information comprises a first DMRS configuration specifying a first DMRS symbol duration of the plurality of DMRS symbol durations during which the first UE performs a first listen-before-talk (LBT) operation and a second DMRS symbol duration of the plurality of DMRS symbol durations during which a third UE performs a second LBT operation.

20. The method of claim 8, wherein:
the second subband comprises a plurality of physical uplink shared channels (PUSCHs), multiplexed in time or frequency, and
the communicating the uplink transmission comprises transmitting, to the base station in a first PUSCH of the plurality of PUSCHs, an uplink signal using resources included in the resource allocation that at least partially overlap resources of the downlink transmission associated with the second UE.

21. An apparatus for wireless communication at a base station, the apparatus comprising:
at least one processor;
a transceiver; and
a memory, coupled to the at least one processor and the transceiver, storing instructions, which when executed by the at least one processor, cause the apparatus to:
generate control information comprising a resource allocation of an uplink transmission associated with a first user equipment (UE) and a demodulation reference signal (DMRS) configuration of a downlink transmission associated with a second UE;
transmit, to the first UE on a first subband of an unlicensed frequency band, via the transceiver, the control information; and
receive, from the first UE on the second subband, via the transceiver, the uplink transmission based on the DMRS configuration and a correspondence between channel activity on the second subband and the downlink transmission associated with the second UE.

22. The apparatus of claim 21, wherein:
the first subband comprises a plurality of physical downlink control channels (PDCCHs), multiplexed in time or frequency,
the transmitting the control information comprises to transmit, to the first UE in a first PDCCH of the plurality of PDCCHs, the control information, and
the instructions, which when executed by the at least one processor, further cause the apparatus to:
determine whether the downlink transmission associated with the second UE overlaps the uplink transmission associated with the first UE; and
select the first PDCCH of the plurality of PDCCHs for transmission of the control information when the downlink transmission associated with the second UE overlaps the uplink transmission associated with the first UE.

23. The apparatus of claim 21, wherein:
the first subband comprises a plurality of group common physical downlink control channels (GC-PDCCHs), multiplexed in time or frequency, and
the transmitting the control information comprises to transmit, to the first UE in a first GC-PDCCH of the plurality of GC-PDCCHs, via the transceiver, the control information,
the instructions, which when executed by the at least one processor, further cause the apparatus to:
determine whether the downlink transmission associated with the second UE overlaps a plurality of uplink transmissions associated with a plurality of UEs; and
select the first GC-PDCCH of the plurality of GC-PDCCHs for transmission of the control information when the downlink transmission associated with the second UE overlaps the plurality of uplink transmissions associated with the first UE and a third UE.

24. The apparatus of claim 23, wherein:
the downlink transmission associated with the second UE comprises a plurality of DMRS symbol durations, and
the control information comprises a first DMRS configuration specifying a first DMRS symbol duration of the plurality of DMRS symbol durations during which the first UE performs a first listen-before-talk (LBT) operation and a second DMRS symbol duration of the plurality of DMRS symbol durations during which the third UE performs a second LBT operation.

25. A method of wireless communication at a base station (BS), the method comprising:
generating control information comprising a resource allocation of an uplink transmission associated with a first user equipment (UE) and a demodulation reference signal (DMRS) configuration of a downlink transmission associated with a second UE;
transmitting, to the first UE on a first subband of an unlicensed frequency band, the control information; and
receiving, from the first UE on the second subband, the uplink transmission based on the DMRS configuration and a correspondence between channel activity on the second subband and the downlink transmission associated with the second UE.

26. The method of claim 25, wherein:
the first subband comprises a plurality of physical downlink control channels (PDCCHs), multiplexed in time or frequency, and
the transmitting the control information comprises transmitting, to the first UE in a first PDCCH of the plurality of PDCCHs, the control information.

27. The method of claim 26, further comprising:
determining whether the downlink transmission associated with the second UE overlaps the uplink transmission associated with the first UE; and
selecting the first PDCCH of the plurality of PDCCHs for transmission of the control information when the downlink transmission associated with the second UE overlaps the uplink transmission associated with the first UE.

28. The method of claim 25, wherein:
the first subband comprises a plurality of group common physical downlink control channels (GC-PDCCHs), multiplexed in time or frequency, and
the transmitting the control information comprises transmitting, to the first UE in a first GC-PDCCH of the plurality of GC-PDCCHs, the control information.

29. The method of claim 28, further comprising:
determining whether the downlink transmission associated with the second UE overlaps a plurality of uplink transmissions associated with a plurality of UEs; and
selecting the first GC-PDCCH of the plurality of GC-PDCCHs for transmission of the control information when the downlink transmission associated with the second UE overlaps the plurality of uplink transmissions associated with the first UE and a third UE.

30. The method of claim 29, wherein:
the downlink transmission associated with the second UE comprises a plurality of DMRS symbol durations, and
the control information comprises a first DMRS configuration specifying a first DMRS symbol duration of the plurality of DMRS symbol durations during which the first UE performs a first listen-before-talk (LBT) operation and a second DMRS symbol duration of the plurality of DMRS symbol durations during which the third UE performs a second LBT operation.

* * * * *